(12) United States Patent
Taaghol et al.

(10) Patent No.: US 9,843,624 B1
(45) Date of Patent: Dec. 12, 2017

(54) DISTRIBUTED SOFTWARE DEFINED NETWORKING

(71) Applicants: Pouya Taaghol, San Jose, CA (US); Vivek Ramanna, San Jose, CA (US)

(72) Inventors: Pouya Taaghol, San Jose, CA (US); Vivek Ramanna, San Jose, CA (US)

(73) Assignee: Pouya Taaghol, San Jose, CA (US)

( * ) Notice: Subject to any disclaimer, the term of this patent is extended or adjusted under 35 U.S.C. 154(b) by 143 days.

(21) Appl. No.: 14/295,331

(22) Filed: Jun. 4, 2014

Related U.S. Application Data

(60) Provisional application No. 61/834,807, filed on Jun. 13, 2013.

(51) Int. Cl.

| | |
|---|---|
| *H04L 12/24* | (2006.01) |
| *H04L 29/06* | (2006.01) |
| *H04L 29/08* | (2006.01) |
| *G06F 9/445* | (2006.01) |
| *G06F 9/44* | (2006.01) |
| *G06F 21/57* | (2013.01) |
| *H04W 4/00* | (2009.01) |
| *G06F 21/44* | (2013.01) |

(52) U.S. Cl.
CPC ............ *H04L 67/10* (2013.01); *G06F 9/4406* (2013.01); *H04L 41/042* (2013.01); *G06F 8/60* (2013.01); *G06F 21/44* (2013.01); *G06F 21/57* (2013.01); *H04L 63/0218* (2013.01); *H04W 4/00* (2013.01)

(58) Field of Classification Search
CPC .. H04W 28/02–28/0268; H04W 24/00–24/04; H04W 40/36; H04W 52/0222–52/0235; H04W 76/002–76/048; H04W 84/042; H04W 88/16; G06F 8/20; G06F 9/455–9/4856; G06F 8/60–8/70; G06F 9/44505–9/5077; G06F 11/3664–11/3688; G06F 21/51–21/575; H04L 43/045–43/0806; H04L 49/70; H04L 49/90; H04L 63/08; H04L 63/102–63/1416; H04L 67/10–67/2861
See application file for complete search history.

(56) References Cited

U.S. PATENT DOCUMENTS

| | | | |
|---|---|---|---|
| 7,114,021 B2 | 9/2006 | Seshadri | |
| 7,630,706 B2 * | 12/2009 | Weigand | ................. H04L 29/06 455/418 |
| 8,132,166 B2 | 3/2012 | DeHaan | |

(Continued)

OTHER PUBLICATIONS

"A short introduction to cloud platforms" by David Chappell, Aug. 2008.*

(Continued)

*Primary Examiner* — Wing F Chan
*Assistant Examiner* — Raji Krishnan
(74) *Attorney, Agent, or Firm* — Roark IP

(57) ABSTRACT

The Distributed Software Defined Network (dSDN) disclosed herein is an end-to-end architecture that enables secure and flexible programmability across a network with full lifecycle management of services and infrastructure applications (fxDeviceApp). The dSDN also harmonizes application deployment across the network independent of the hardware vendor. As a result, the dSDN simplifies the network deployment lifecycle from concept to design to implementation to decommissioning.

21 Claims, 18 Drawing Sheets

(56) References Cited

U.S. PATENT DOCUMENTS

| | | | | |
|---|---|---|---|---|
| 8,528,108 | B2* | 9/2013 | Ammer | G06F 21/575 713/187 |
| 8,650,299 | B1* | 2/2014 | Huang | G06F 9/5077 709/226 |
| 8,756,595 | B2* | 6/2014 | Arcilla | G06F 8/60 709/201 |
| 8,843,933 | B1* | 9/2014 | Holler | G06F 9/45533 718/104 |
| 9,226,333 | B2* | 12/2015 | Steiner | H04W 76/045 |
| 2002/0016954 | A1* | 2/2002 | Charisius | G06F 8/20 717/106 |
| 2004/0107417 | A1 | 6/2004 | Chia | |
| 2004/0237081 | A1* | 11/2004 | Homiller | G06F 8/68 717/170 |
| 2005/0246703 | A1 | 11/2005 | Ahonen | |
| 2007/0078988 | A1* | 4/2007 | Miloushev | G06F 9/485 709/227 |
| 2008/0209491 | A1* | 8/2008 | Hasek | H04N 7/17318 725/114 |
| 2009/0007091 | A1 | 1/2009 | Appiah | |
| 2009/0113327 | A1* | 4/2009 | Pogrebinsky | G06F 8/61 715/765 |
| 2009/0276771 | A1* | 11/2009 | Nickolov | G06F 9/4856 717/177 |
| 2009/0300057 | A1* | 12/2009 | Friedman | G06F 11/3664 |
| 2011/0075611 | A1* | 3/2011 | Choi | H04L 1/1819 370/329 |
| 2012/0300615 | A1* | 11/2012 | Kempf | H04W 24/02 370/216 |
| 2013/0007254 | A1* | 1/2013 | Fries | H04L 43/0876 709/224 |
| 2013/0160147 | A1* | 6/2013 | Draluk | G06F 21/51 726/30 |
| 2013/0263104 | A1* | 10/2013 | Baset | G06F 8/70 717/168 |
| 2014/0052976 | A1* | 2/2014 | Marino | G06F 21/56 713/2 |
| 2014/0241158 | A1* | 8/2014 | Anthony, Jr. | H04W 28/0231 370/235 |
| 2014/0254373 | A1* | 9/2014 | Varma | H04W 40/36 370/235 |
| 2014/0259012 | A1* | 9/2014 | Nandlall | H04W 4/003 718/1 |
| 2014/0317293 | A1* | 10/2014 | Shatzkamer | G06F 9/455 709/226 |
| 2015/0173121 | A1* | 6/2015 | Miklos et al. | H04W 76/046 370/329 |

OTHER PUBLICATIONS

McKeown et al, "OpenFlow: Enabling Innovation in Campus Networks" Mar. 14, 2008.*

Li et al, "Toward Software-Defined Cellular Networks" published in 2012 European Workshop on Software Defined Networking.*

"Network Functions Virtualisation" white paper published Oct. 22-24, 2012 at the "SDN and OpenFlow World Congress", Darmstadt-Germany.*

Yap et al "OpenRoads: Empowering Research in Mobile Networks" published in 2010 ACM SIGCOMM Computer Communication Review.*

Bansal et al, "OpenRadio: A Programmable Wireless Dataplane" published in HotSDN'12, Aug. 13, 2012, Helsinki, Finland.*

Stallings et al, "Software-Defined Networks and OpenFlow" published in The Internet Protocol Journal, vol. 16, No. 1, Mar. 2013.*

Luo et al, "Software Defined Networking across Distributed Datacenters over Cloud" published 2013 IEEE International Conference on Cloud Computing Technology and Science.*

* cited by examiner

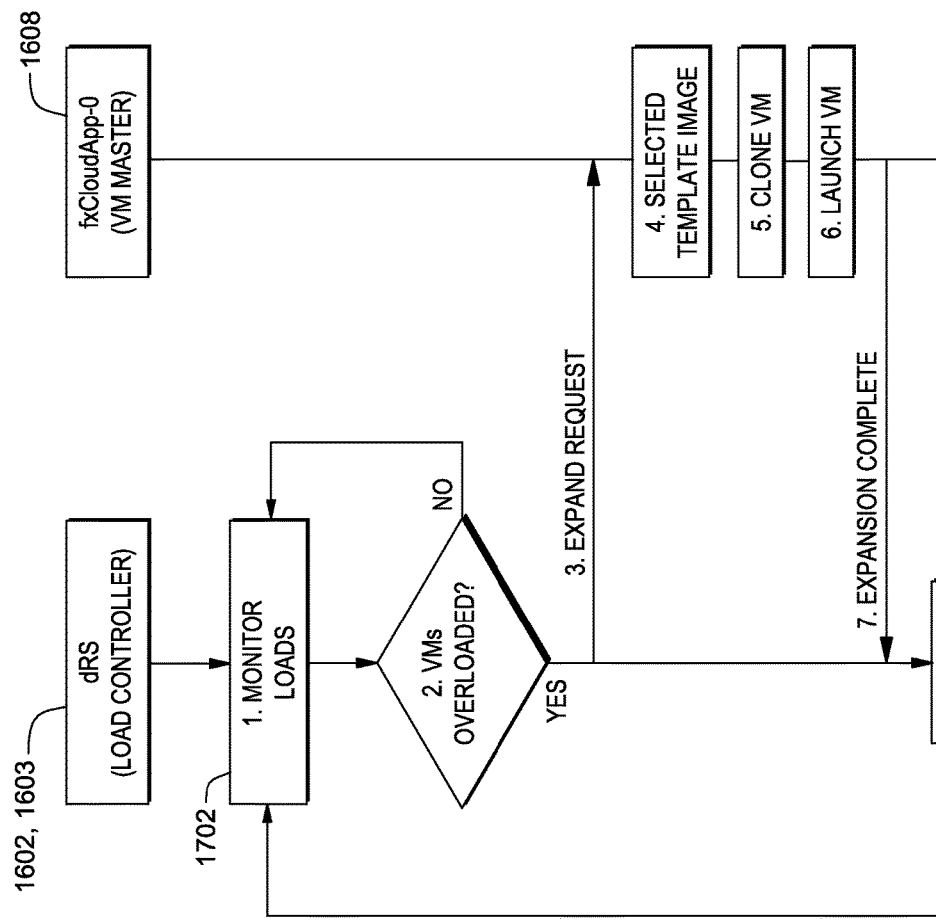

DISTRIBUTED SOFTWARE DEFINED NETWORKING

CROSS-REFERENCE TO RELATED PATENT APPLICATIONS

The present invention claims priority from U.S. Provisional Patent Application Ser. No. 61/834,807, filed Jun. 13, 2013 the disclosure of which is herein specifically incorporated by reference in its entirety.

FIELD OF THE INVENTION

This invention relates to a network architecture that facilitates secure and flexible programmability between a user device and across a network with full lifecycle management of services and infrastructure applications.

BACKGROUND

Existing network solutions are built on proprietary hardware and software. Network Operators & Information Technology (NOIT) can only configure the proprietary network infrastructure provided by vendors and are unable to add new and customized features or capabilities. As a result, the NOIT can only add new desired features by making such requests to their infrastructure vendors or pursuing standardization processes. But these existing approaches are time consuming and resource intensive.

SUMMARY OF THE INVENTION

An aspect of the disclosure herein is a plurality of network elements in a packet system, said network elements comprising: a flexible network device adapted to process data flows in the packet system having at least one fxDeviceApp; a flexible cloud platform having at least one fxCloudApp, wherein the at least one fxDeviceApp and at least one fxCloudApp are in secure communication to form a distributed application; and an application management portal which manages life cycle of the distributed applications.

Another aspect of the disclosure is a plurality of network elements in a packet system, said network elements comprising: a flexible cloud platform having a plurality of virtual machines, wherein each of the virtual machines has at least one fxCloudApp; and a flexible network device adapted to process data flows in the packet system having at least one fxDeviceApp, wherein the at least one fxDeviceApp and fxCloudApp are in secure communication to form a distributed application.

Another aspect of the disclosure is a plurality of network elements in a packet system, said network elements comprising: a flexible cloud platform having a plurality of zones, wherein each of the plurality of zones has at least one fxCloudApp; and a flexible network device adapted to process data flows in the packet system having at least one fxDeviceApp, wherein the at least one fxDeviceApp and fxCloudApp are in secure communication to form a distributed application.

BRIEF DESCRIPTION OF THE DRAWINGS

FIGS. 17A and 17B demonstrate example procedures for cloud breathing procedures.

DETAILED DESCRIPTION

Figure 1:
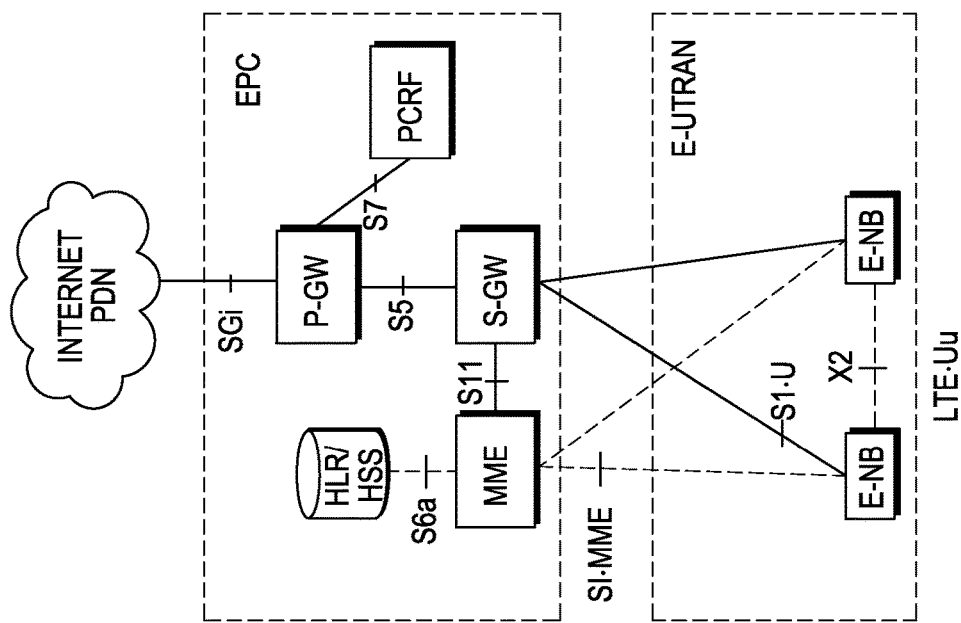
FIG. 1 demonstrates the network architecture of a 4G system.

The Distributed Software Defined Network (dSDN) disclosed herein is an architecture that enables secure and flexible programmability across a network with full lifecycle management of services and infrastructure applications (fxDeviceApp). The dSDN also harmonizes application deployment across the network independent of the hardware vendor. As a result, the dSDN simplifies the network deployment lifecycle from concept to design to implementation to decommissioning.

Definitions, Acronyms & Abbreviations

The following terms, acronyms, abbreviations and descriptions are explained below and are used throughout the detailed description of the dSDN:

| TERM | DESCRIPTION |
| --- | --- |
| 2G | 2nd Generation Cellular Technology |
| 3G | $3^{Rd}$ Generation Cellular Technology |
| 4G | $4^{th}$ Generation Cellular Technology |
| AP | WiFi Access Point |
| API | Application Programming Interface |
| AR | Application Repository |
| ASIC | Application Specification Integrated Circuit |
| AuC | Authentication Center |
| BS | Base Station |
| BSC | Base Station Controller |
| BTS | Base Station |
| CDN | Content Distribution Network |
| CN | Core Network |
| CNIE | Core Network Internet Edge |
| CPU | Central Processing Unit |
| dAP | Distributed Application Package |
| dApp | Distributed App |
| dCP | Distributed Content Service |
| dNS | Distributed Notification Service |
| DNS | Domain Name System |
| DPDK | Data Plane Development Kit |
| DPI | Deep Packet Inspection |
| dRS | Distributed Resource Service |

| TERM | DESCRIPTION |
| --- | --- |
| DSCP | Differentiated Service Code Point (QoS) |
| E-UTRAN | Evolved UMTS Terrestrial Radio Access Network |
| EIR | Equipment Identity Register |
| eNB | Enhanced Node B (4G) |
| FIB | Flow Information Base |
| FQDN | Fully Qualified Domain Name |
| fxApp | FleXible Application, which has a fxDeviceApp and fxCloudApp component. fxDeviceApp and fxCloudApp of one application represent fxApp. |
| fxDeviceApp | FleXible Application which runs on fxDevice |
| fxBS | FleXible Base Station that is a BS that is powered by fxOS (an example of an fxDevice) |
| fxCloud | FleXible Cloud that interacts with fxDevice and on other network elements on the northbound interface |
| fxCloudApp | FleXible Cloud Application that is the application that runs on fxCloud and can be associated to one or more fxDeviceApp in fxDevice |
| fxManager | FleXible Manager that manager the fxOS lifecycle (provisioning, usage, de-provisioning) |
| fxOS | FleXible Operation System which run on the fxDevice as the OS and firmware |
| fxSDK: | FleXible Software Development Kit |
| fxSimulator | FleXible Simulator |
| fxStore | FleXible Store that presents fxApp to the network |
| administratorsGERAN | GPRS Edge Radio Access Network |
| GGSN | Gateway GPRS Support Node (used in core network of 2G/3G systems) |
| GMSC | Gateway Mobile Switching Center |
| GPRS | General Packet Radio Service |
| GPS | Global Positioning System |
| GTP | GPRS Tunneling Protocol |
| GW | Gateway |
| HAL | Hardware Abstraction Layer |
| HD | High Definition |
| HLR | Home Location Register |
| HSS | Home Subscriber Server |
| IAC | Inter Application Communication |
| IMS | IP Multimedia Sub-system |
| IMSI | International Mobile Subscriber Identifier |
| IMSI | International Mobile Subscriber Identity |
| IF | Internet Protocol |
| JVM | Java Virtual Machine |
| LA | Location Area |
| LAN | Local Area Network |
| LSP | Label Switching Protocol |
| M2M | Machine to Machine |
| MAC | Medium Access Control |
| MCP | Multi Chip Packaging |
| MIMO | Multi Input Multi Output |
| MME | Mobility Management Entity (used in core network of LTE) |
| MNO | Mobile Operator Network |
| MPLS | Multi Protocol Label Switching |
| MSC | Mobile Switching Center |
| MSISDN | Mobile Station |
| NAS | Non-Access Stratum |
| NB | Node B (3G) |
| NFC | Near Field Communication |
| NFV | Network Function Virtualization |
| NOIT | Network Operations & Information Technology; this term network broadly includes carriers, service providers, enterprise networks, and designated/contacted 3$^{rd}$ party administrators. |
| OS | Operating System |
| OTT | Over the Top |
| P-GW | Packet Gateway |
| PaaS | Platform-as-a-Service |
| PBX | Private Branch exchange (telephony) |
| PDG | Packet Data Gateway |
| PDN | Packet Data Network |
| PHY | Physical Layer |
| PLMN | Public Land Mobile Network |
| PnP | Plug and Play |
| PP | Packet Processor |
| PR | Platform Resources |
| PSTN | Public Switched Telephone Network |
| QoS | Quality of Service |
| RA | Routing Area |
| RAN | Radio Access Network of cellular networks |
| RAPI | Resources API |
| RFID | Radio Frequency Identifier |
| RNC | Radio Network Controller |
| S-GW | Serving Gateway |
| S1-AP | S1 Interface Application Protocol (an LTE protocol between MME and eNodeB) |
| SaaS | Software-as-a-Software |
| SDK | Software Development Kit |
| SDN | Software Defined Network |
| SGSN | Serving GPRS Support Node (used in core network of 2G/3G systems) |
| SIM | Subscriber Identity Module |
| SiP | System in a Package |
| SMS | Short Message Service |
| SoC | System on a Chip |
| SON | Self-Optimizing Network |
| SSDP | Simple Service Discovery Protocol |
| TA | Target Area |
| TNE | Test Network Environment |
| TTM | Time to Market |
| UMTS | Universal Mobile Telecommunication System |
| UPnP | Universal Plug and Play |
| URA | UMTS Routing Area |
| URI | Uniform Resource Identifier |
| UTRAN | UMTS Terrestrial Radio Access Network |
| VLR | Visitor Location Register |
| VM | Virtual Machine |
| VPN | Virtual Private Network |
| WAN | Wide Area Network |
| WLAN | Wireless Local Area Network |
| WLAN | Wireless Local Area Network |
| XMPP | Extensible Messaging and Presence Protocol |

Database. One or more large structured sets of persistent data maintained upon a computer system organized and structured according to a software system defining rules for organization as well as responding to queries to read, write, or modify data as well as provide statistical information regarding the contained data. As used in this disclosure in describing the dSDN, a database may be either a single unified system or a distributed system wherein certain database elements are located upon different systems or servers which may be in different physical locations, acting in harmony to appear as one unified database. Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. The database formats may include relational databases, object-based models and/or distributed databases which could be used to store and manipulate the data types described herein. Likewise, object methods or behaviors of a database can be used to implement various processes, such as the described herein. In addition, the databases may, in a known manner, be stored locally or remotely from a device which accesses data in such a database.

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. The term "determining" does not imply certainty or absolute precision, and therefore "determining" can include estimating, extrapolating, predicting, guessing and the like. The term "determining" does not imply that mathematical processing must be performed, and does not imply that numerical methods must be used, and does not imply that an algorithm or process is used.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

Although process (or method) steps may be described or claimed in a particular sequential order, such processes may be configured to work in different orders. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred. Where a process is described in an embodiment the process may operate without any user intervention.

It will be readily apparent to one of ordinary skill in the art that the various processes of the dSDN described herein may be implemented by, e.g., appropriately programmed general purpose computer(s), special purpose computer(s) and computing device(s). Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, controllers, microcontrollers, digital signal processors, or like devices or any combination thereof, regardless of the architecture (e.g., chip-level multiprocessing/multi-core, Reduced Instruction Set Computer (RISC), Complex Instruction Set Computer (CISC), Microprocessor without Interlocked Pipeline Stages, pipelining configuration, or simultaneous multithreading).

Further, programs that implement methods described herein may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only to implement the embodiments.

The term "non-transitory computer readable medium" in this disclosure refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media may include, for example, optical or magnetic disks and other persistent memory. Volatile media may include dynamic random access memory (DRAM), which typically constitutes the main memory. Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of non-transitory computer-readable media in which the dSDN may be implemented include, for example, a floppy disk, a flexible disk, hard disk, magnetic tape, any other magnetic medium, a CD-ROM, DVD, any other optical medium, punch cards, paper tape, any other physical medium with patterns of holes, a Random Access Memory (RAM), a programmable read only memory (PROM), an erasable programmable read only memory (EPROM), a flash electrically erasable programmable read only memory (FLASH-EEPROM), any other memory chip or cartridge, a carrier wave as described hereinafter, or any other medium from which a computer can read.

Various forms of computer readable media in this disclosure may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), Bluetooth, and Transmission Control Protocol/Internet Protocol ("TCP/IP"), Time Division Multiple Access (TDMA), Code Division Multiple Access (CDMA), and 2G/3G; and/or (iv) encrypted to ensure privacy or prevent fraud in any of a variety of ways well known in the art.

Thus in some embodiments in this disclosure a description of a process may be a description of a non-transitory computer-readable medium storing a program for performing the process. The computer readable medium may store (in any appropriate format) those program elements which are appropriate to perform the method.

In an embodiment, a server computer, network element or centralized authority may not be necessary or desirable. For example, an embodiment may be practiced on one or more devices without a central authority. In such an embodiment, any functions described herein as performed by the server computer or data described as stored on the server computer may instead be performed by or stored on one or more such devices.

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Numerous embodiments are described in the present application, and are presented for illustrative purposes only. The described embodiments are not, and are not intended to be, limiting in any sense. One of ordinary skill in the art will recognize that the disclosed embodiment(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments. A description of an embodiment with several components or features does not imply that all or even any of such components/features are required. On the contrary, a variety of optional components are described to illustrate the wide variety of possible embodiments of the present invention(s).

The following description has been presented for purposes of illustration and description and is not intended to be exhaustive or to limit the embodiments to the precise form disclosed. Many modifications and variations are possible in light of the teachings disclosed herein.

The embodiments were chosen and described to explain principles of operation and their practical applications. However, the scope of the invention is to be defined by the claims.

The major technical reason for inflexibility in network infrastructure has been related mostly to the proprietary hardware and rigid software architecture in the existing network elements (routers, switches, gateways, cellular base-stations, WiFi access points, etc.). With recent advancements in semiconductor device manufacturing, there is no longer a cost barrier to add computing power to many electronics in the market including networking infrastructure. The addition of such compute capabilities would open up new opportunities for programmable platforms in the network and ultimately creating more flexible network architecture and business models.

The Distributed Software Defined Network (dSDN) disclosed herein is an end-to-end architecture that enables secure and flexible programmability across a network with full lifecycle management of services and applications (fxApp). The dSDN also harmonizes fxApp deployment across the network independent of the hardware vendor. As a result, the dSDN simplifies the network deployment lifecycle from concept to design to implementation to decommissioning. In this disclosure, the dSDN is applied to the wireless networks as an exemplary embodiment. However, the dSDN is not limited to wireless networks embodiments and it could be applied to many other network types including enterprise, wireline service providers, data centers, and Internet of Things (IoT).

FIG. 1 demonstrates the network architecture of a 4G system 100. (In alternative embodiments, the system and method disclosed may also be implemented in a 2G/3G network as well). In a cellular network, the base station or BS (denoted as BTS in 2G, NodeB or NB in 3G, and eNodeB or eNB in 4G systems) is responsible for termination of a wireless link (air-interface) to the mobile device (also known as the User Equipment (UE)). The BS then transports the user data to the core network and communicates control-signaling messages with the core network. In a typical cellular network, there are thousands of BS's covering nations. Each BS covers an area known as a cell. As the demand for mobile Internet expands, the mobile network operator (MNO) needs to deploy smaller cells so it can reuse the frequency more often.

A BS is made up of the following main functional blocks: 1) radio frequency (RF) front end; 2) clock; 3) baseband; 4) power manager; and 5) central processing unit (CPU). Some BS's also have a dedicated packet processor (PP) to accelerate packet processing in hardware. BS vendors may also use custom or merchant System-on-a-Chip (SoC) or Multi-Chip-Packaging (MCP) solutions to combine various functions into a single chip (e.g., PP, CPU, and baseband).

Even though there has been attempts to open up various interfaces in the BS (such as the Open BS Architecture Initiative that defines interfaces between these functional modules in the BS), there has been very little to no efforts to unify the programmability of the BS itself. As a result, the MNOs suffer from the following difficulties. First, the core network Internet edge (CNIE), Packet Data Gateway (PDG) and the surrounding functions are becoming extremely complicated, non-scalable, and expensive. Second, each MNO needs certain customization and feature sets. Currently, they depend on their vendors for these customizations, which could cost the MNO tremendously both financially and in regards to time-to-market (TTM); hence, hindering innovation. In addition, usually these features are put into standards or in the vendor's feature set, thus eliminating the MNO differentiation against the other MNOs. Third, if the MNO is multi-vendor in their CNIE, coordinating all the vendors to implement the same features is usually a difficult and a time-consuming effort. As a result, more add-on network appliances are introduced into the CNIE which adds to the network management complexity. Fourth, as a BS becomes Internet Protocol (IP) based, there is more visibility into the user traffic types and new innovative opportunities are missed for creative traffic shaping features, backhaul bandwidth optimization, prioritization at radio edge, power management algorithms, etc. Fifth, many features implemented in CNIE present suboptimal performance. For example, the filtering enforcement at CNIE is fundamentally inefficient since the packets have to travel all the way through the expensive air-interface, the backhaul, various other core network elements and transport networks to get to the CNIE. Sixth, the Radio Access Network (RAN) deployments are a very expensive endeavor for MNOs. The current rigid BS designs limit innovation and force the MNOs to undergo major upgrades every few years.

The problems stated above apply to many different types of networks even though here they are presented in cellular networks as a focus. In the present disclosure, the dSDN exhibits a new paradigm in the software programmability of networks that would address the problems above and enable many more advanced features.

Figure 2:
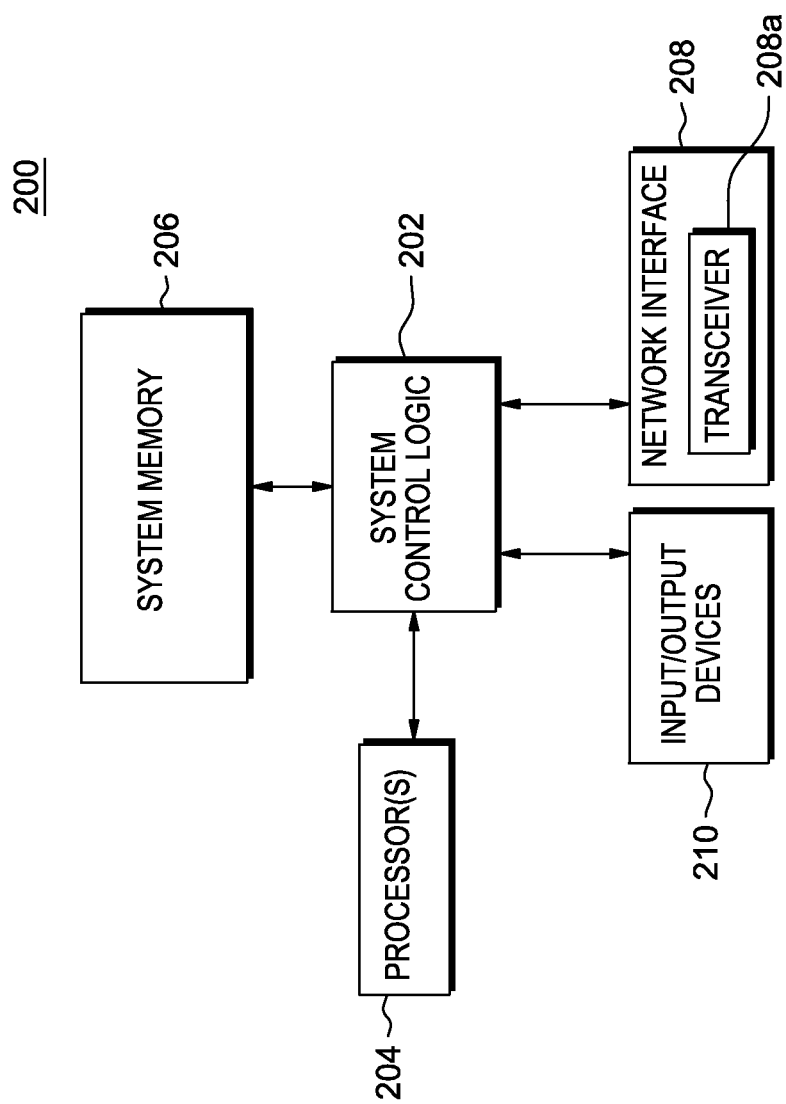
FIG. 2 illustrates a network element (or system) upon which the Distributed Software Defined Network operates.

The dSDN may be located at a network element (or system) 200 which is shown in detail in FIG. 2 or in alternative embodiments the functions of the dSDN may be divided among a plurality of network elements (or systems) which are similar in structure to network element 200. Each network element 200 may comprise one or more system control logic 202 coupled with at least one or a plurality of processor(s) 204, system memory 206, a network interface 208 (including a transceiver 208a), and input/output (I/O) devices 210. The processor(s) 204 may include one or more single-core or multi-core processors. The processor(s) 204 may include any combination of general-purpose processors and dedicated processors (e.g., graphics processors, application processors, baseband processors, etc.). System control logic 202 for one embodiment may include any suitable interface controllers to provide for any suitable interface to at least one of the processor(s) 204 and/or to any suitable device or component in a packet network in communication with system control logic 202. System control logic 202 for one embodiment may include one or more memory controller(s) to provide an interface to system memory 206. System memory 206 may be used to load and store data and/or instructions, for example, for network element 200. System memory 206 for one embodiment may include any suitable volatile memory, such as suitable dynamic random access memory (DRAM), for example. System memory 206 may also include non-volatile memory including one or more tangible, non-transitory computer-readable media used to store data and/or instructions, for example, such as the embodiments described herein with regard to the dSDN. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The system memory 206 may include a storage resource physically part of a device on which the network element 200 is installed or it may be accessible by, but not necessarily a part of, the device. For example, the system memory 206 may be accessed over a network via the network interface 208 and/or over Input/Output (I/O) devices 210. Network interface 208 may include a transceiver 208a to provide a radio interface for network element 200 to communicate over one or more network(s) and/or with any other suitable device. Network interface 208 may include any suitable hardware and/or firmware. The network interface 208 may include a plurality of antennas to provide a multiple input, multiple output radio interface. Network interface 208 for one embodiment may include, for example, a wired network adapter, a wireless network adapter, a telephone modem, and/or a wireless modem. For one embodiment, at least one of the processor(s) 204 may be packaged together with logic for one or more controller(s) of system control logic 202. For one embodiment, at least one of the processor(s) 204 may be integrated on the same die with logic for one or more controller(s) of system control logic 202. In various embodiments, the I/O devices 210 may include user interfaces designed to enable user interaction with the network element or system 200, peripheral component interfaces designed to enable peripheral component interaction with the network element or system 200, and/or sensors designed to determine environmental conditions and/or location information related to the network element or system 200. In various embodiments, the peripheral component interfaces may include, but are not limited to, a non-volatile memory port, a universal serial bus (USB) port, an audio jack, and a power supply interface.

dSDN Architecture

Figure 3:
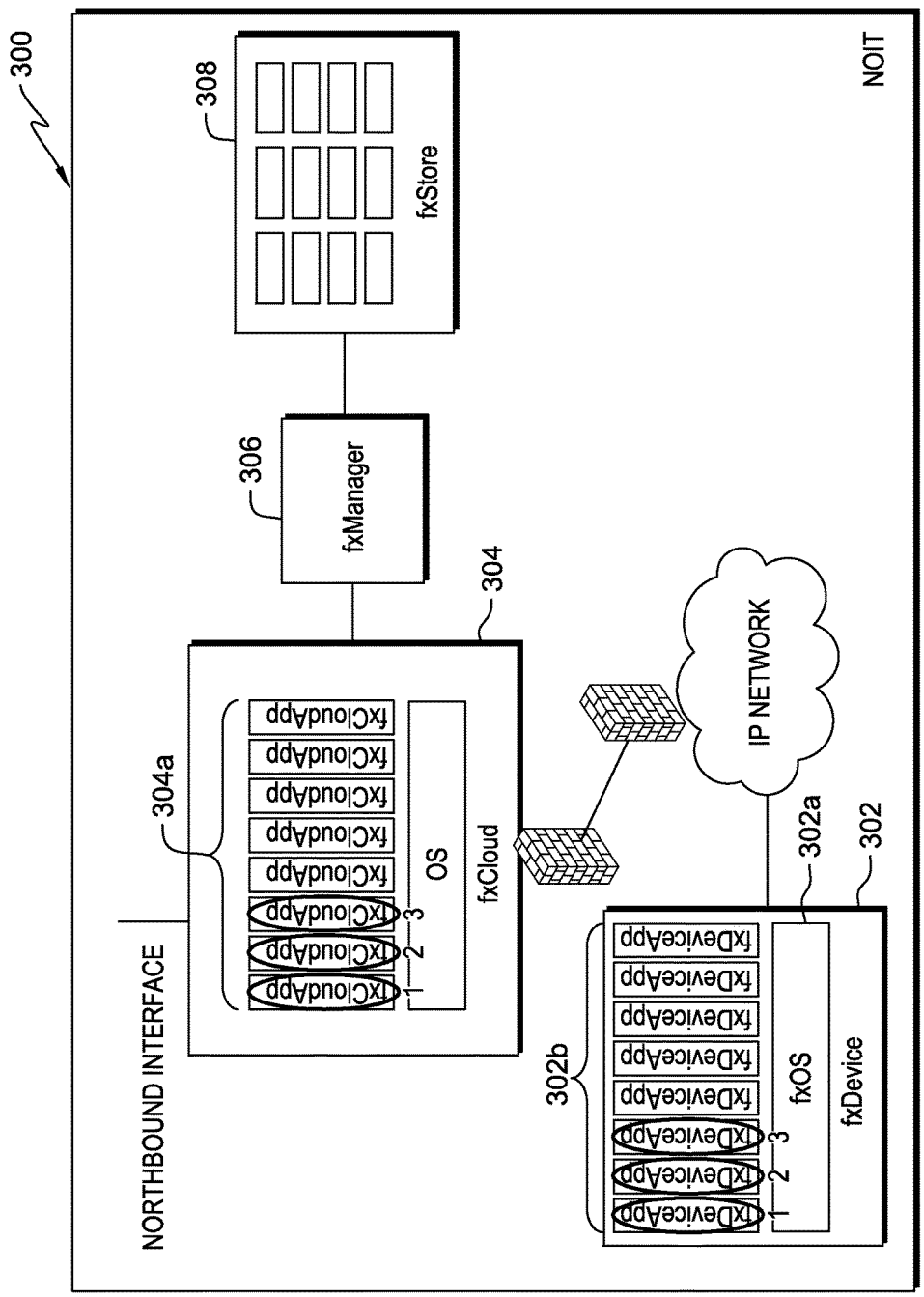
FIG. 3 illustrates a Distributed Software Defined Network in accordance with the present disclosure.

In the dSDN architecture, the network features are virtualized and may be distributed across separate network elements that cooperate together to create an advanced, programmable, and scalable network. In an alternative embodiment, the network features may be located at a single network element. A high-level overview of a dSDN system 300 is depicted in FIG. 3. The dSDN system 300 consists of a flexible network device (fxDevice) 302, a flexible cloud platform (fxCloud) 304, an application management portal (fxManager) 306, and an infrastructure application market place (fxStore) 308. The fxDevice 302 is a network device that is powered by a sandboxing operating system named flexible operating system (fxOS) 302a. The sandboxing operating system ensures each application runs as a dedicated process in sure isolation from the other applications. The fxOS 302a may be built based on an existing sandboxed operating system (OS) (e.g., Android®) by extending several aspects of such an OS with routing/networking layers and supports for operating as the wireless infrastructure. The fxDevice 302 may host several independent and securely isolated applications (on top of fxOS 302a) named here fxDeviceApp 302b.

In the dSDN system, fxDeviceApp 302b may have a sister app in the backend cloud infrastructure (i.e., flexible cloud platform) referenced here as fxCloudApp 304a. The fxCloudApp 304a in the cloud is paired with its fxDeviceApp 302b in the fxDevice 302. The fxCloudApp 304a and the fxDeviceApp 302b collectively form a distributed application (dApp or fxApp). In this description, when fxApp is referenced it shall mean any application that may have software components in the fxDevice, fxCloud, or both. In general, an fxApp package may include the following software components:
   fxDeviceApp binary;
   fxCloudApp binary;
   Manifest files; and
   Signatures.

It is important to note that the fxDeviceApp 302b and fxCloudApp 304a could use any protocol to communicate with each other and there is no need for standardizing this communication allowing for ultimate freedom for the developers. This allows for the system to operate in a loosely coupled autonomous fashion allowing for asynchronous communication in a distributed fashion.

The fxApps lifecycle is managed via fxManager 306. The fxManager 306 presents a user-friendly portal to the network administrator (admin) to discover, test prior to deployment, provision, and deprovision dApps. Using fxManager 306, the admin may discover new fxApps from the fxStore 308, which presents all the tested and certified virtual applications (vApps) as well as showing the supported fxOs version, support hardware platforms, and other information such as reviews and number of commercial deployments by all NOIT customers.

fxOS fxDevice 302 is defined as any networking equipment embedded with a special flexible operating system (fxOS) 302a. The purpose of fxOS 302a is to enable a carrier-class programmable platform. The fxOS 302a is configured to do, but is not limited to, the following. First, since fxOS 302a is designed for network equipment, it allows for efficient execution and running all the time. A plurality of power save modes may be implemented to ensure energy saving schemes without hindering the functionality of the fxDevice 302. Second, it enables simultaneous execution of several flexible applications (fxDeviceApp 302b) on the fxDevice 302. Third, it allows for application of a legacy compiled binary or byte-code of another language (for example, Java or Android®) in addition to fxDeviceApps 302b. Fourth, it allows FastPath processing for data plane packets. The packet forwarding in this case separated from the control plane operations. The FastPath engine allows integration with specialized hardware accelerators or packet processors (PP). The packet forwarding may be implemented with software/kernel enhancements all in software. Another Fast-Path implementation may use both software/kernel enhancement and hardware packet processors (PP). Fifth, the fxOS 302a is capable of Deep Packet Inspection (DPI) and identifying all the flows and their related protocols, services and present this information in a format useful to application developers. The fxOS 302a can act on the data flows as the directed by the application developer. Sixth, applications are securely isolated from each other and to communicate with them is completely configurable by policies defined by the admin. Seventh, resource utilization of each application is policed such that an application may not be able to exceed its usage. For example, an application is pre-allocated the memory size, cache/storage space, and CPU cycles. Eighth, the applications may be signed with unique certificate security keys. The security keys and certificates may be allocated and/or signed by a certificate authority. The fxDevice 302 may be protected by validating signed applications to run or to install in the device. Ninth, it allows hot upgrade of the software and applications on the platform with little to no interruption to the operational aspect of the platform and its applications. Tenth, the fxOS 302a may boot by using the secure code from the network servers (cloud-booting). This would ensure tamper-proof software foundation for the fxDevice 302. Eleventh, there may be a secure and programmable firewall in the fxOS 302a. This embedded firewall protects against attacks to the fxDevice 302 and network attached to the network. The fxOS 302a firewall may be configured by the developer and it does allow replacing of attack detection algorithms (e.g., man-in-the-middle detection algorithm). The fxOS 302a may allow secure caching of user data, web pages, and media files (video and audio) in the fxDevice 302. The secure connections to the cloud (fxCloud 304) can enable sharing and control of the caching between the fxCloud 304, fxDevice 302, or the rest of the network. Twelfth, the fxOS 302a can support multithreading and multi-core CPUs. This feature may dynamically distribute the threads to various CPU core without developers assistance.

The fxOS 302a allows secure connection to the fxCloud 304. This secure connection allows communication between fxDeviceApps 302b in the fxDevice 302 and fxCloudApp 304a in the fxCloud 304. The fxOS 302a controls the access of applications to platform APIs. An application is categorized into an Access Level (AL) based on which the fxOS 302a decides that the application does not exceed its AL and access APIs that it is not authorized. The fxCloud 304 and the fxOS 302a create a virtual fabric (fxVF) for messaging between applications. The actual message can travel directly between two fxDevices or it may traverse the fxCloud 304. The messaging complexity may be abstract for the developer.

Figure 4:
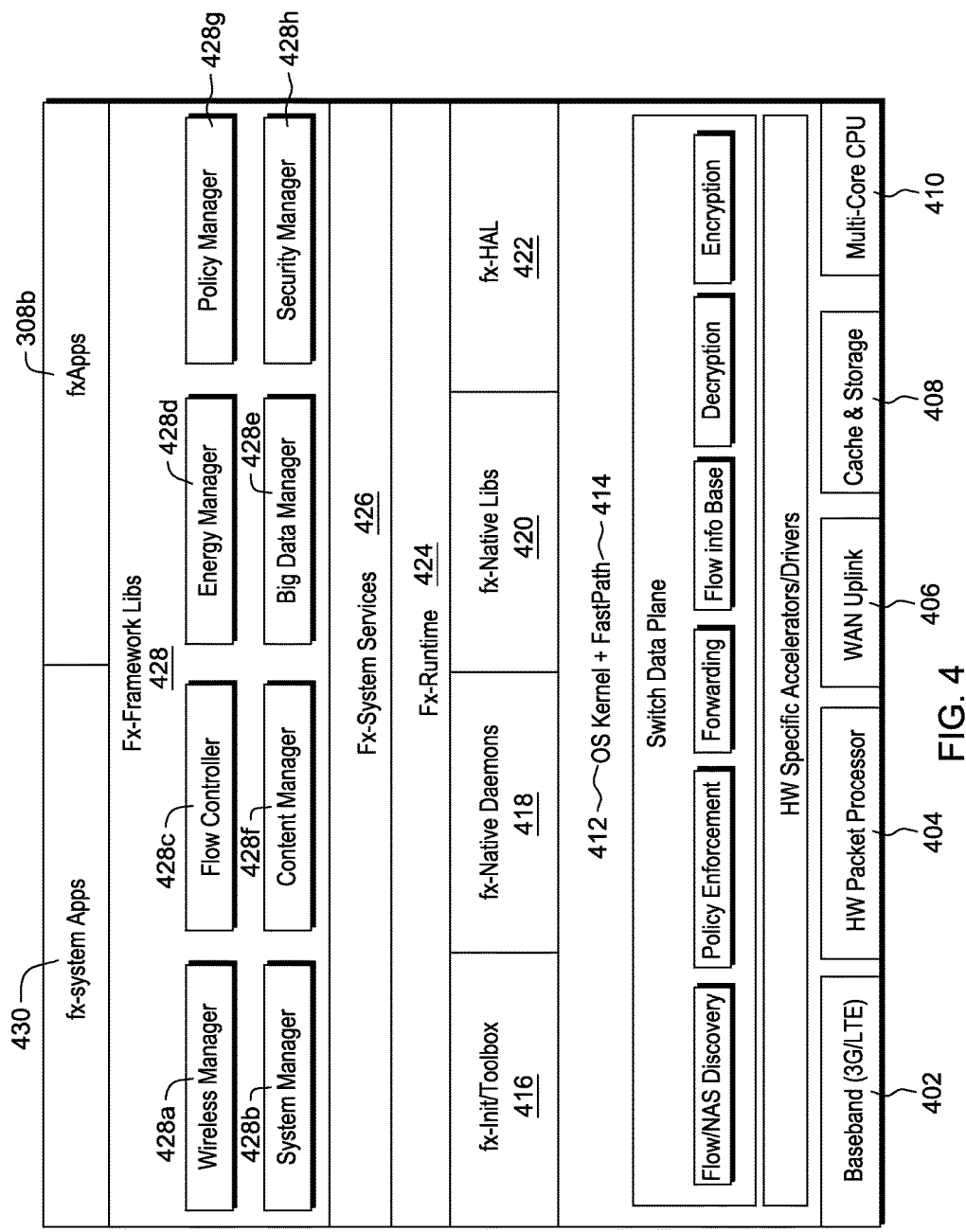
FIG. 4 is an exemplary view of the software layers in the Flexible Operation System (fxOS) Architecture.

FIG. 4 demonstrates an examplary view of the software layers in the fxOS 302a. Each layer of this software stack is modified and redefined to optimize for embedded networking equipment of wireless and wireline nature. Starting from the bottom of the stack, the kernel also connects to the hardware resources via the device drivers. Examples of such resources are wireless baseband SoC 402, hardware packet processor 404, Wide Area Network (WAN) uplink interface 406, cache and storage 408, and multi-core CPU 410. The OS kernel 412 is enhanced with the FastPath function 414 to accelerate packet processing (by help of hardware features such as Intel's Data Plane Development Kit (DPDK) or pure software enhancements) and other related data path functions. The enhanced kernel with FastPath 412, 414 would enable visibility into the data flows, sniffing the Non-Access Stratum (NAS) signaling (which is the signaling between the UE and the Core Network and the RAN is supposed to be transparent to), policy enforcements, regular packet forwarding functions, collection of flow statistics into Flow Information Base (FIB), and encryption/decryption functions.

Above the kernel, there are several tools 416, native daemons 418, native libraries 420 and Hardware Abstraction Layers (HAL) 422. These tools abstract out the hardware dependencies for the upper layers and programmers. The Runtime 424 is an embedded virtual machine capable of securely isolating and executing the applications. System Services 426 are a set of services always running and available to the developers (e.g., timing and messaging services).

fx-Framework Library 428 consists of several Frameworks. The new frameworks are the library extensions introduced explicitly for the dSDN framework. Each of these frameworks adds a set of methods of (functions) and data structures for the following examples:

Wireless Manager 428a: manipulation, monitoring, and configuration of the wireless interfaces;

System Manager 428b: configuration, provisioning, and changing major settings of the fxDevice 302;

Flow Controller 428c: allows for manipulation of data path, tunneling, switching, and optionally coordinate this activity with fxCloud 304;

Energy Management 428d: enables fine-grained control over various elements in the fxDevice 302 that could be moved into various power stares, for example: ON, OFF, SLEEP, SUSPEND;

Big Data Manager 428e: manipulation, processing, and organization of data collected from various elements. This framework could enable close coordination between the fxDevice 302 and the fxCloud 304;

Content Manager 428f: for data sharing (database sharing) between the applications within the fxDevice 302 or the fxCloud 304 and between applications in fxDevice 302 and fxCloud 304. The Content Manager 428f may use URI to address the contents to be shared. The Content Manager 428f allows access to the application data according to the policy settings and permissions;

Policy Manager 428g: responsible for execution and implementation of polices set up by the admin. The application developers could use this framework to perform queries about the permissions, limitations, and rules;

Security Manager 428h: allows for access to the security protocol libraries and rewriting some of security algorithms such as the man-in-the-middle detection algorithm;

General Framework: general compute and logic building that may be inherited from existing general OS frameworks.

Using the frameworks, there are potentially at least two types of application types that are possible. First, the System Native Applications 430 that are provided as the initial application load into the platform. These applications could be used by other applications by links or API. Second, the fxDeviceApps 302b that are written by third party developers or the NOIT.

Figure 5:
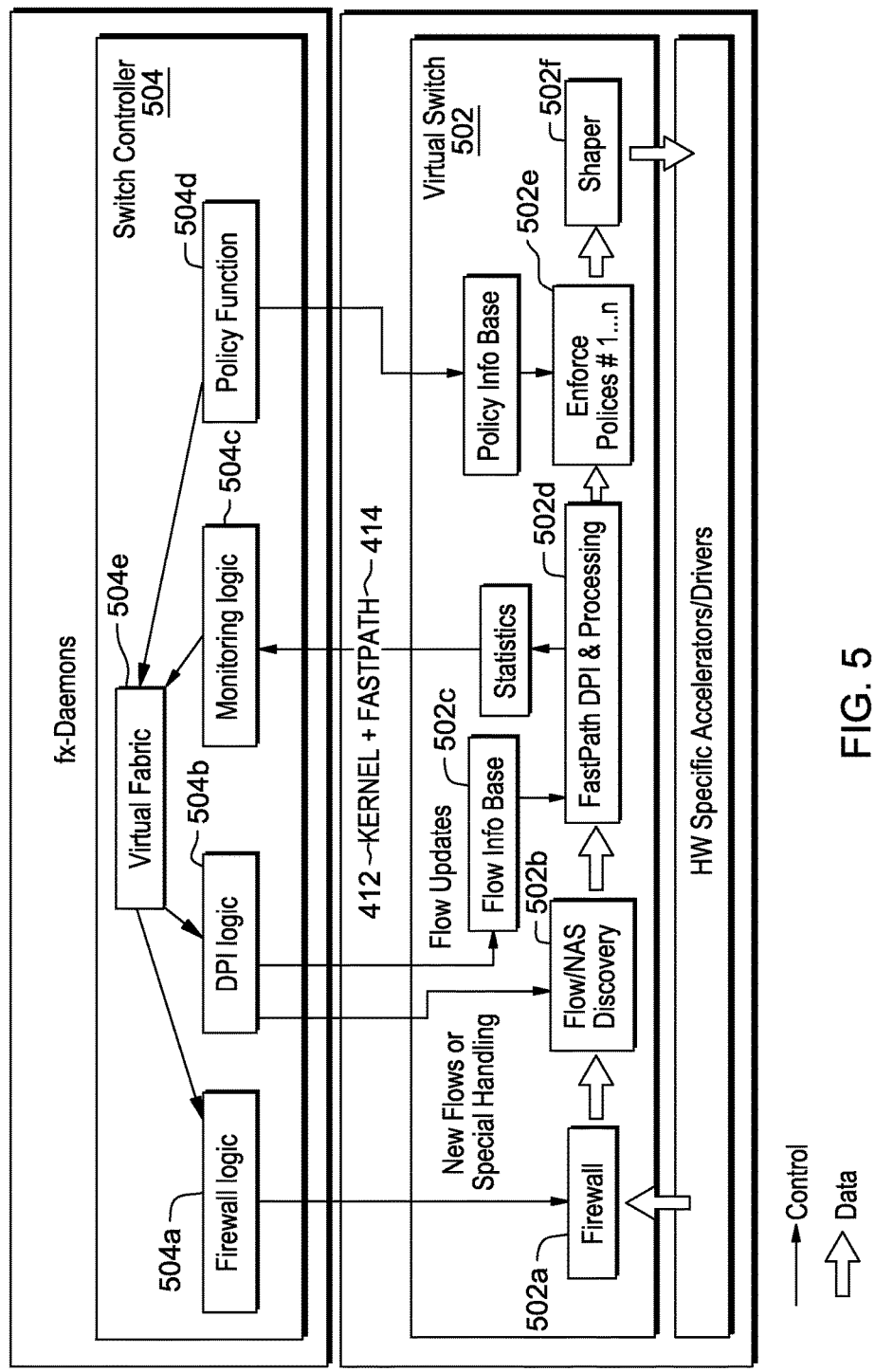
FIG. 5 illustrates the FastPath architecture.

FIG. 5 further details the FastPath 414 architecture. In this approach, the FastPath 414 is divided into the Virtual Switch (data-plane) 502 and the Switch Controller (control-plane) 504. Such separation makes possible flexible deployment wherein the function of the Switch Controller 504 could move to the fxCloud 304 by an admin decision or by the dSDN system intelligence for example in the case of failure, redundancy, stateful reboot, or Hot Upgrade. The Virtual Switch 502 may include several functions and may interact with the Switch Controller 504 in the following exemplary ways:

- Firewall 502a: implements the policies given to it by the firewall logic 504a in the fxOS Daemons.
- Flow/NAS Discover 502b: continuously monitors data packets and discovers new flows and NAS signaling. It would then report it to the DPI Logic 504b where the flow intelligence resides and matching to meta-data happens. DPI Logic 504b in turn updates the Flow Information Base Information (FIB) 502c of the Virtual Switch 502.
- FastPath & DPI Processing 502d: forwards, routes packets, and performs DPI functions as instructed by the FIB 502c. It also collects statistics of packets and reports them to the Monitoring Logic 504c.
- Policy Enforcement 502e: this function enforces various policies on the traffic such as QoS marking according to the policies received from the Policy Logic 504d.
- Shaper 502f: this function could shape (queue) the traffic according to the available bandwidth on the uplink or WAN interface.
- Virtual Fabric (fxVF) 504e: enables transparent switching of application and system messages of a dApp between the fxCloud 304 and the fxDevice 302 and between different dApps. The fxVF 504e is an abstraction layer that hides most of the complexities of messaging from the developers. The fxVF 504e uses the policies and firewall rules to enforce security and policies.

The fxOS 302a is mostly used for networking applications. There are some potential use cases where there is a need for a general purpose OS to run the legacy software applications with no need of recompilation. An example of a double OS situation may be where a digital signage (using a general purpose OS such as Android®) in a shopping mall also acts as a smart small-cell (using the fxOS 302a). In such a solution, any existing Android® application (for example) could be loaded in the fxDevice 302 and in parallel networking applications (fxDeviceApps 302b) could run on the same fxDevice 302.

Figure 6:
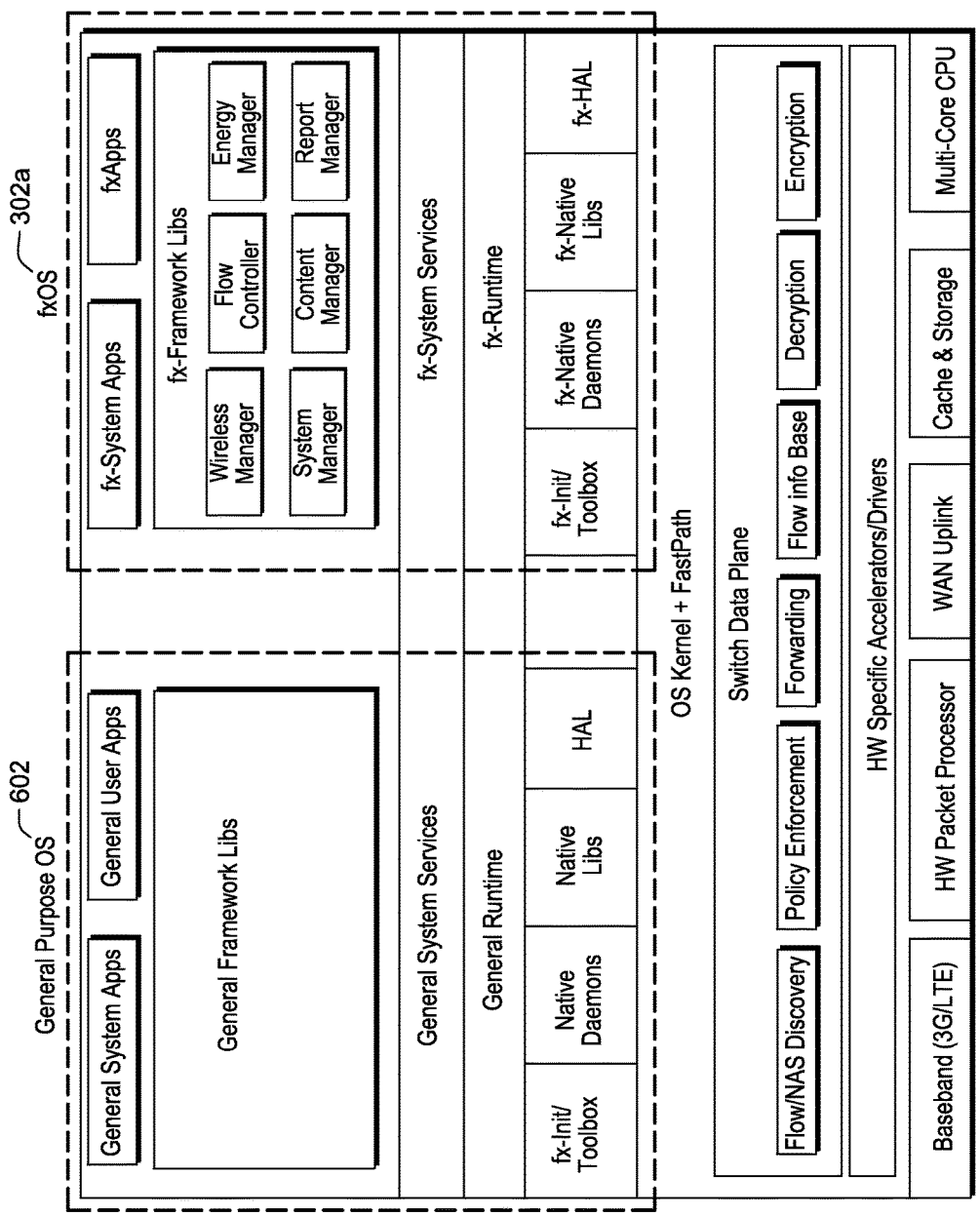
FIG. 6 presents a potential software layer of the fxOS co-existing alongside a general purpose OS.

FIG. 6 presents a potential software layer of the fxOS 302a co-existing alongside a General Purpose OS 602. Another implementation may be a standalone fxOS without the company of another general OS. It is important to note that the shown co-existence allows reuse of the kernel so there would be no need to re-port the drivers of hardware resources twice.

fxCloud

The fxCloud 304 is an integral part of the dSDN framework. The fxCloud 304 connects to various parts of the fxDevice 302 to form a single virtual view of the system. Examples of the main fxCloud 304 responsibilities include the following. First, it interacts and manages all applications, firmware, and fxOS 302a in the fxDevice 302. Second, it secures isolation environments for distributed apps. Third, it directs the Virtual Machine lifecycle management including load-linked VM creations and destruction (Cloud Breathing). Fourth, the fxCloud 304 executes instructions defined by the fxManager 306. Fifth, it implements uniform policy (including security) distribution and execution across dSDN 300 (including the fxDevice 302, fxDeviceApps 302b, fxCloudApps 304a, and dApps). Sixth, Plug-and-Play commissioning of the fxDevice 302 introduction and network expansion. Seventh, Distributed Resource Service (dRS) by which distributed applications can seamlessly communicate and message to each other using published APIs or proprietary methods within the pre-defined policies. Eighth, security violation discovery and alert system. Ninth, translation and/or exposure of Resources APIs (RAPI) to the systems outside the dSDN 300 within pre-defined policies. Tenth, fxCloud 304 in coordination with the fxDevice 302 creates a Distributed Notification Service (dNS) across the dSDN 300 by which the applications could be notified of an event to wakeup and/or respond to the event. Eleventh, fxCloud 304 in coordination with the fxDevice 302 creates a Distributed Content Management Service (dCMP) which provides a virtualized and distributed database system for applications to share application-specific or system-specific information with the pre-defined policies. Twelfth, the Switch Controller 504 function in the fxCloud 304 could take control of the controller function of the fxOS 302a in the fxDevice 302. This would allow controller switching from local to remote and back. Examples of such a configuration is a temporary reason where the fxOS Switch Controller 504 may not be available during reboot or software upgrade.

In the discussion below, these services and features are expanded upon.

fxDeviceApp-0 & fxCloudApp-0

The fxDevice 302 and fxCloud 304 have embedded System Applications categorized as fxDeviceApp-0 and fxCloudApp-0, respectively. The fxDeviceApp-0 is responsible for all default and core functional capabilities of the fxDevice 302 as listed below:

Firmware of the fxDevice;
Default communication protocols (e.g. LTE S1-AP, baseband software, security protocols, GTP, DNS, tunneling protocols);
Message communication protocol between the fxDevice and fxCloud;
Initial fxDevice settings;
Boot Loader;
fxDevice X.509 digital certificate;
OS and Kernel upgrades;
Upgrade and commissioning agents for the fxDeviceApp-0 upgrades and related procedures;
Establishing and initiating the message communication protocol between the fxDevice and fxCloud;
General fxDeviceApp install and upgrades;
Access to fxDevice hardware and software information.
  The fxCloudApp-0 is responsible for all default and core functional capabilities of the fxCloud 304 such as:
Upgrade and commissioning agents for the fxCloudApp-0 upgrades and related procedures;
Hypervisor upgrades;
Virtual Machine lifecycle management (e.g. creation, suspension, destruction);

fxCloud X.509 digital certificate management;
OS and kernel upgrades;
General fxCloudApp install and upgrades;
Default communication protocols (e.g. security protocols, DNS, tunneling protocols).

Each software component can be managed and updated individually. To simplify the management of these software components, each software components can be sub-numbered such as fxDeviceApp-0.1, fxDeviceApp-0.2, fxCloudApp-0.1, fxCloudApp-0.2, etc.

fxManager

The network administrator may use the fxManager 306 to control much of the dSDN system 300. The fxManager portal could use HTML5, for example, as a frontend technology. The major functions of the fxManager 306 may include the following.

fxDevice Management:
  Commissioning (plug-and-play), de-commissioning, firmware/OS upgrading/downgrading;
  Suspend/resume functions;
  Unification of zones and partitions for example in case of network merger;
  Detailed management of fxDevices (remote secure login) where the administrator may zoom into a particular or a group of fxDevices to monitor and set management alarms;
  Security policy setting.
Application lifecycle management: fxManager 306 may work, coordinate, and/or perform these tasks in conjunctions with fxCloud 304 for:
  Provisioning, de-provisioning, upgrade/downgrade applications. Some applications may only have a fxDevice component (Device-Centric Apps), may only have fxCloud component (Cloud-Centric Apps), or may have both fxDevice and fxCloud components (Hybrid Apps);
  Creating a Test Network Environment (TNE) where the administrator can test certain configuration and applications without impacting the production networks;
  Uploading applications developed by the NOIT or their partners into the Application Repository (AR). The AR is placeholder where the application packages are downloaded and stored for testing and verification prior to installation into the live dSDN system. An application could have several components (e.g. fxDeviceApp binaries, fxCloudApp signatures, manifest files, signatures) bundled together to form the Distributed Application Package (dAP);
  Browsing through the certified applications in the fxStore and downloading them to the AR;
  Application license accounting services by which a secure and accurate accounting of the installed applications are performed regularly. This inventory management function allows the administrator and the $3^{rd}$ party ISV to account for live and active instants of the software in the network;
  Application review tool where the network admin could use to review feedbacks and comments of other NOIT (maybe anonymous reviews) and could input his/her reviews for others (maybe anonymous reviews).

fxCloud Management:
  Zoning and partitioning the network for administrative purposes. Zones and partitions could optionally put into different Virtual Machine (VM);
  VM load management and Cloud Breathing policies;
  The configuration conflict resolutions. Some configurations applied to the resources may conflict with each other (e.g., one firewall rule may state drop Netflix packets explicitly and another rule may state allowing Netflix explicitly). The fxCloud resource manager could monitor these configurations and discover the conflicts and signal those to the network administrator.
Security Management:
  Security policy setting;
  Inter-App communication setting;
  Security of communication between fxDevice and fxCloud;
  API Access Level (AL) definitions and (re-)assignment to the applications (permissions);
  Risk Analysis of the applications;
  Certificate and signature verification of the applications;
  Content sharing between applications and associated policies.

Figure 7:
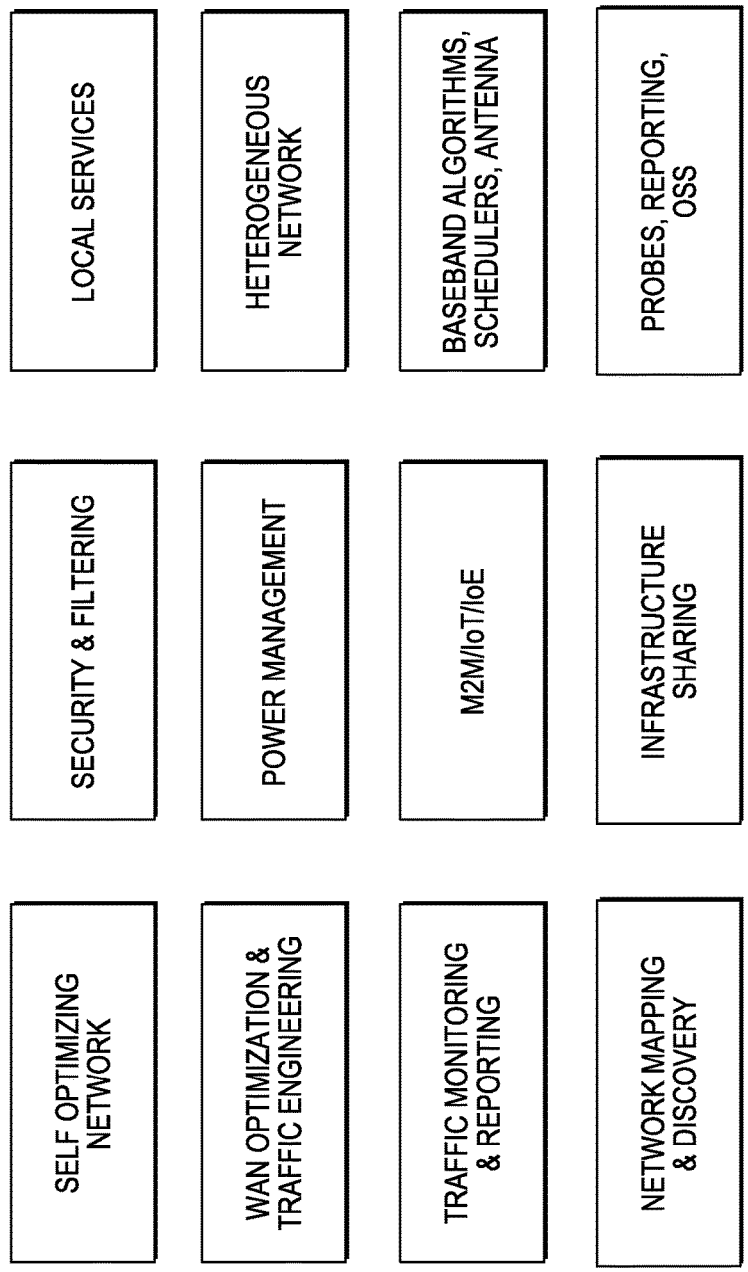
FIG. 7 is an exemplary view of the fxStore Portal.

An fxManager Portal per the above description may have an "Account" button which can be used to create admin users and their privileges. The fxManager Portal could also include a geographical map illustrating locations of fxDevices and their status. The fxManager 306 functions could be integrated into other network management tools. The fxManager 306 could potentially build the inventory of the network devices (fxDevices) showing all the available devices and statistics. As described above, the network administrator could optionally procure the applications a third party hosted application store (fxStore). The fxStore 308 could potentially categorize the applications several groups (as shown in FIG. 7 which is an example view of the fxStore portal). The fxStore 308 could also show the reviews of the advertised applications. In order to maintain quality, the third party fxStore 308 may perform rigorous testing of the applications and accompany those results with the advertised application.

fxSDK

The flexible Software Development Kit (fxSDK) may include a development environment and other tools to facilitate development, testing, debugging and verifications of applications for dSDN environments. The fxSDK is unique in several aspects exemplified as follows. First, since the dSDN applications may have a device component (fxDevice 302) and cloud component (fxCloud 304), the fxSDK allows the developer to develop the components together to simplify the development and testing. Second, the distributed resource management system (dRMS) offers various system level APIs with remote accessibility. In other words, the APIs in the fxDevice 302 could be accessed via the applications in the fxCloud (fxCloudApps) and vice versa. The fxSDK simplifies the usage system created APIs and application created APIs. Third, it is essential for the dSDN to ensure quality and security of applications in the network. The fxSDK may be accompanied with an extensive Risk Analysis Utility (RAU) which verifies all the APIs that are being used by the application and based on its potential danger to the network, it would show the risk analysis and may make specific suggestions to reduce the risk. Once completed, the risk analysis result is included in the dAP for posting to the fxStore and consumed by the fxManager user (the admin). Fourth, the fxSDK would also ensure that the applications do not exceed their planned memory and resource usage. Fifth, the Integrated Development Environment (IDE) may provide various tools to actively demonstrate errors, defined APIs, security dangers, and excessive resource usage. Sixth, the IDE could also provide a flexible Simulator (fxSimulator) for the developer test the application in a network setup in presence of other network elements.

Deployment Examples

The dSDN 300 offers flexible deployment options. In this section, a few exemplary embodiments are presented.

Figure 8:
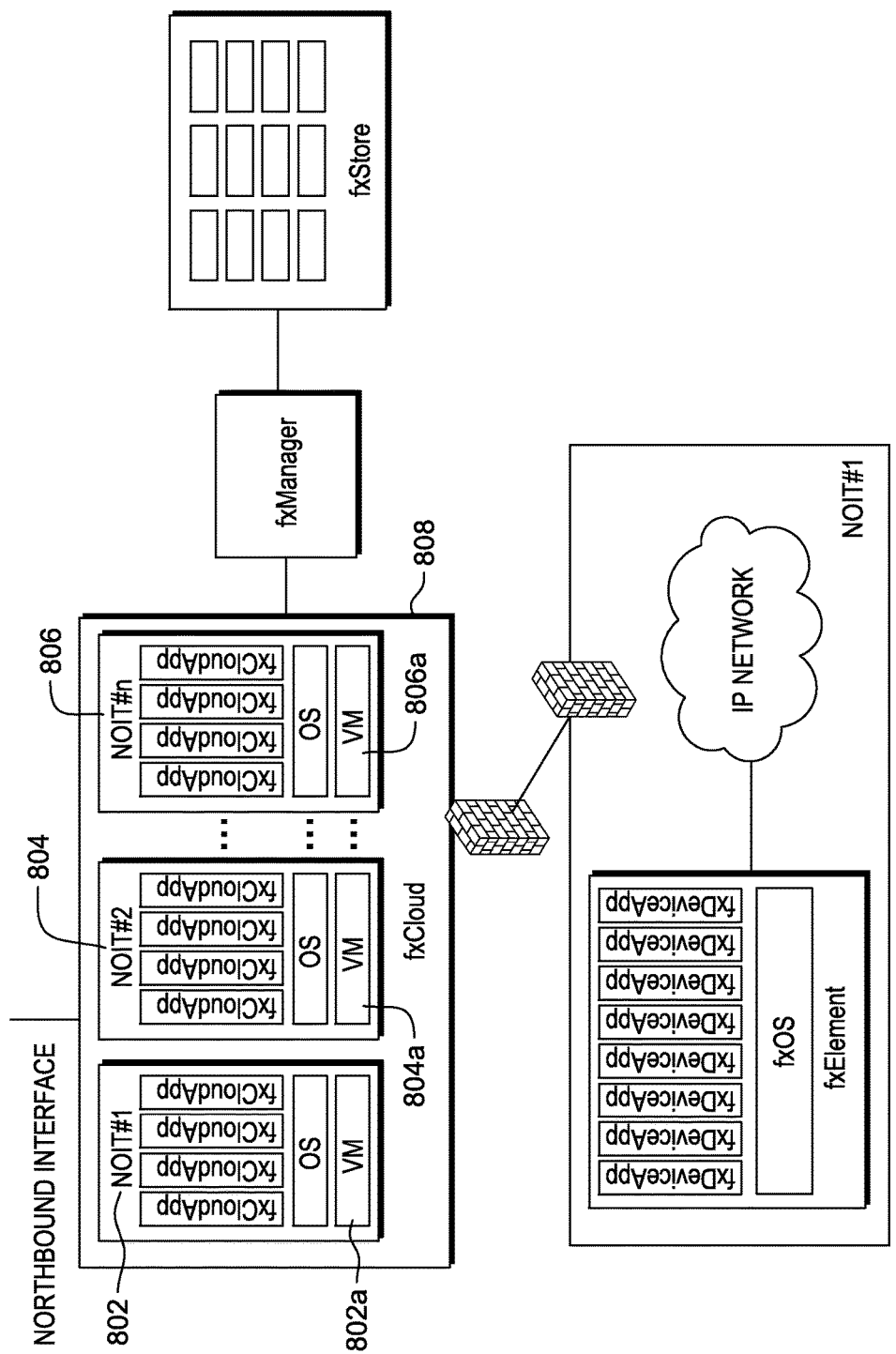
FIG. 8 demonstrates a shared fxCloud deployment.

FIG. 8 demonstrates a shared cloud deployment where several NOITs (802, 804, 806) share an fxCloud 808. In order to ensure complete isolations, each NOIT may be assigned a separate Virtual Machine (VM) 802a, 804a, 806a. A good example of this deployment option may be when multiple service providers outsource their fxCloud deployment to a third party vendor that offers a SaaS/PaaS solution. It is important to note that in this option, each NOIT should have its own secure instance of the whole system. This option could potentially create a full outsourcing model for network operations including possibilities of seamless merging of networks of two or more NOITs.

Figure 9:
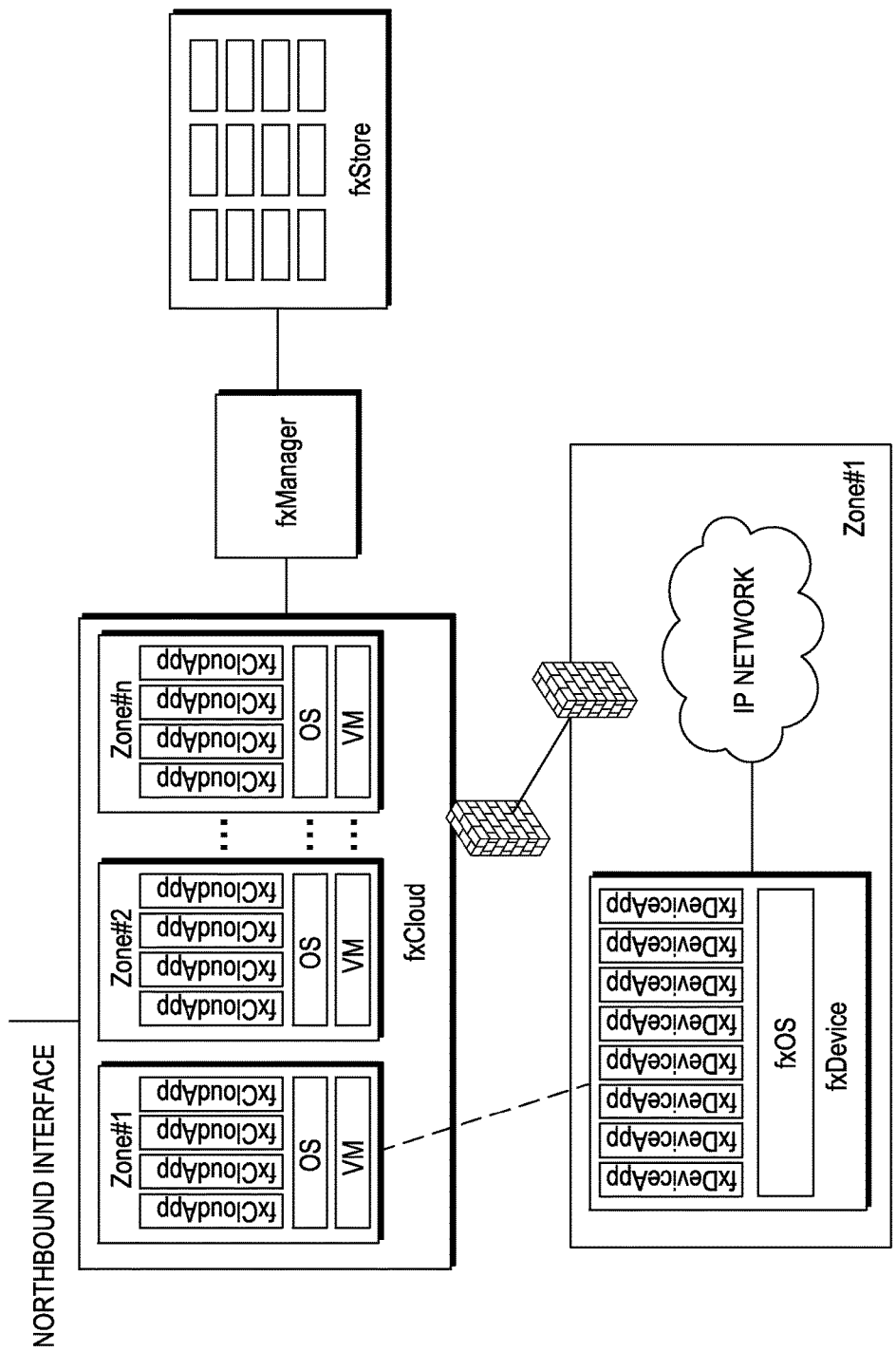
FIG. 9 demonstrates a Zoned Deployment.

Another deployment option may be a Zoned Deployment as shown in FIG. 9. In this option, a large NOIT may partition their network into a plurality of zones (Zone #1, Zone#2, . . . Zone#n) for administrative, software compatibility grouping, or other reason. For example, it is possible that in a large network deployment, there would be different versions of fxOS with varying capabilities in the network (the older hardware may not support newer fxOS version). In this case, the service provider may decide to group the fxDevices per fxOS versions for management simplifications.

Figure 10:
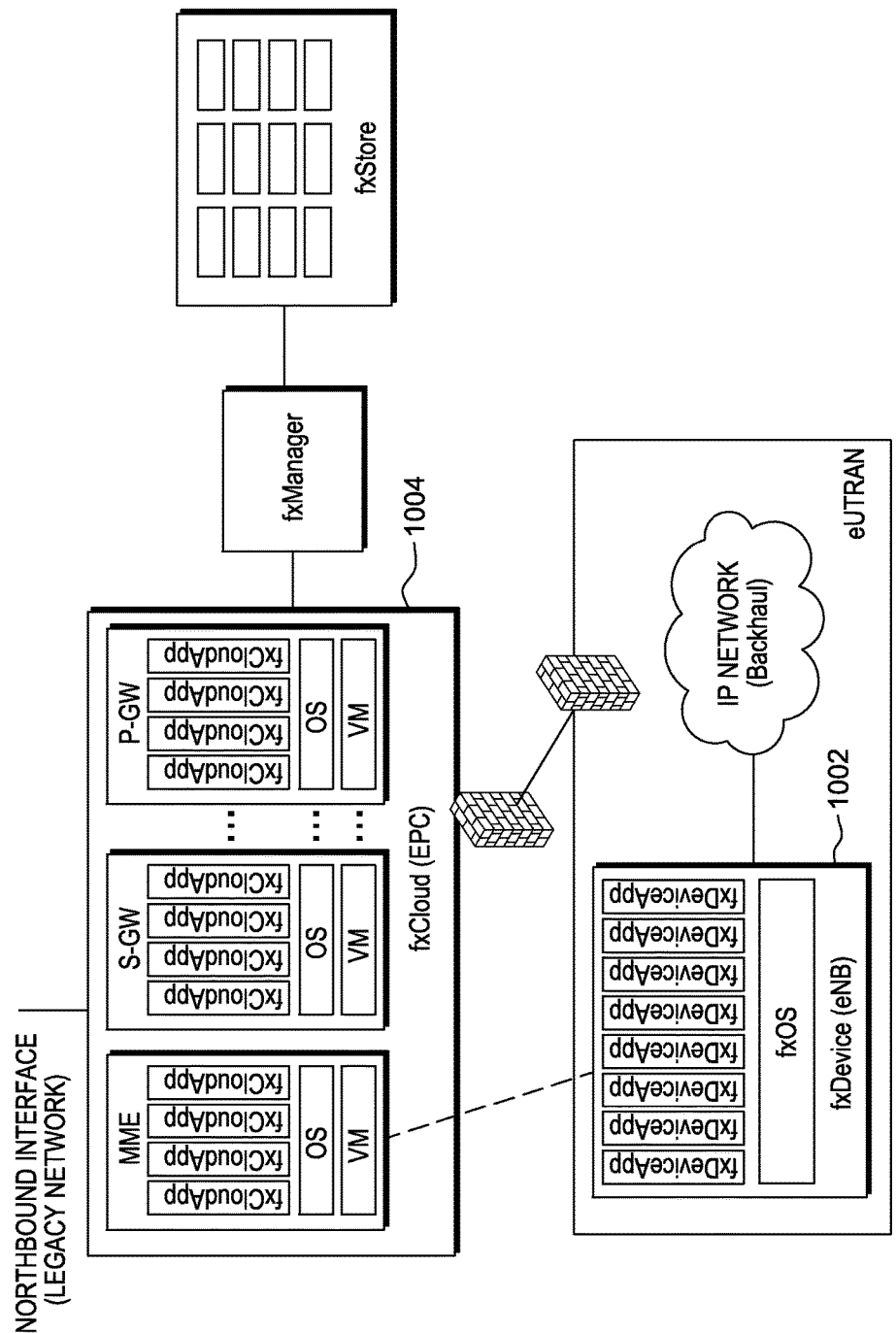
FIG. 10 demonstrates another deployment option as applied to cellular networks (especially Long Term Evolution (LTE)).

FIG. 10 is another embodiment deployed in a Programmable & Virtualized Cellular Network. In this example, the dSDN is applied to the cellular networks (e.g., LTE). As shown, the fxDevice 1002 here is the LTE eNB (4G basestation) and the fxCloud 1004 hosts the LTE core network (EPC) functions such as MME, S-GW, and P-GW in separate VMs. Within each EPC function, new features could be added using the dSDN framework. For example, a new application to optimize signaling for Machine-2-Machine (M2M) devices could be loaded into the fxDevice 1002 and the MME function in the fxCloud 1004.

Principal Procedures & Services

The dSDN framework could offer extensive services and capabilities that would simplify the programmability of the network. In this section below, a set of main procedures and services are presented as further exemplary embodiments.

fxDevice Commissioning Provisioning

Figure 11:
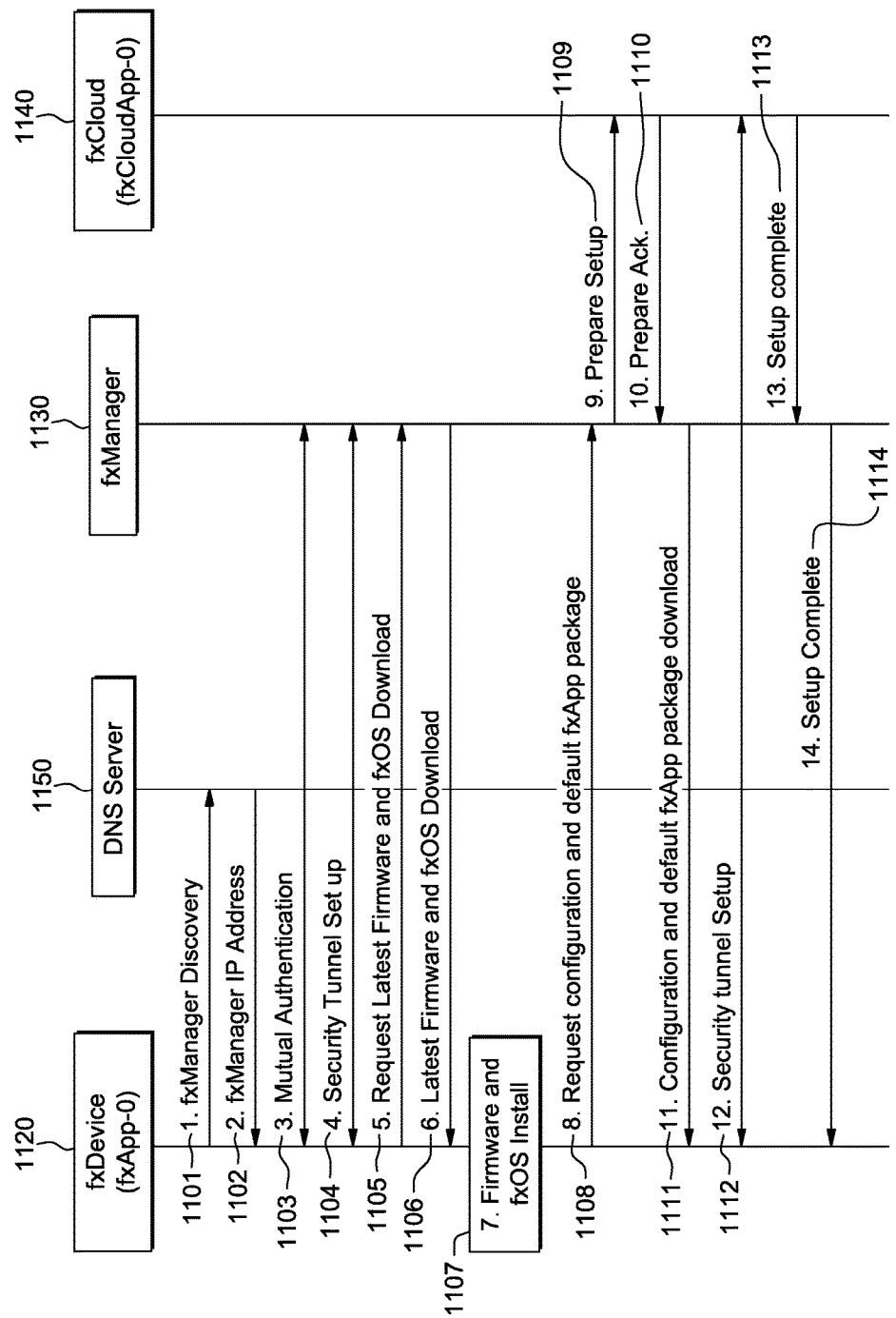
FIG. 11 shows an example of a signaling flow chart for the fxDevice Commissioning Procedure.

FIG. 11 illustrates a signaling flow chart for a fxDevice Plug-and-Play Commissioning Procedure. This procedure enables fxDevice commissioning and initial setup to provide a seamless and Plug-and-Play (PnP) deployment. The fxDevice relies on the fxDeviceApp-0 and the fxCloudApp-0 to connect to the backend management system and perform the commissioning procedure. In step 1101, the fxDevice 1120 tries to discover the fxManager 1130 using the fxManager Fully Qualified Domain Name (FQDN). The fxDevice 1120 is configured to always look for the same FQDN. If the NOIT has a private cloud deployment, the DNS server in the NOIT will be configured to point to its own fxManager IP address. If the cloud is shared, the NOIT will configure their DNS server to point to the shared cloud IP address. In step 1102, the fxDevice 1120 receives the IP address of the fxManager 1130. In step 1103, the mutual authentication may be performed where the fxDevice 1120 authenticates the fxManager 1130 and vice versa. In step 1104, a secure tunnel may be created between the fxDevice 1120 and the fxManager 1130. In step 1105, the fxDevice 1120 may optionally request for the latest firmware/OS version. In this phase, the fxDevice 1120 informs the fxManager 1130 of its hardware information (e.g. vendor, model number, CPU model/speed, memory/cache size) and software information (e.g., current firmware version, current OS version, fxDeviceApp-0 version package stating versions of fxDeviceApp-0 components). In step 1106, the fxManager 1120 may send the latest firmware/OS version (or point the fxDevice to the right URL to download the latest load). In step 1107, if a new firmware/OS load is downloaded and verified, the fxDevice 1120 installs it. In step 1108, the fxDevice 1120 requests the default settings and the default application package (the initial applications that the NOIT admin would like to install in fxDevice 1120 prior to other applications). In step 1109, the fxManager 1130 prepares the fxCloud 1140 for the new fxDevice 1120 integration into the network. In step 1110, once completed, the fxCloud 1140 informs the fxManager 1130 of its readiness. In step 1111, the fxManager 1120 sends all the default settings and the default application package to the fxDevice 1120. In step 1112, the fxDevice 1120 then sets up a secure connection to the fxCloud 1140 (more precisely the fxCloudApp-0). In step 1113, a commissioning completion message is set from the fxCloud 1140 to the fxManager 1130. In step 1114, the fxManager 1130 signal to the fxDevice 1120 the completion of the commissioning and starts th regular operation of the fxDevice 1120. At this phase, fxManager 1130 can optionally modify the settings in the security connections between fxDeviceApp-0 and fx-CloudApp-0 and between fxDeviceApp-0 and fxManager 1130.

Application Provisioning Procedure

The Application Provisioning Procedure enables provisioning and de-provisioning of applications across the dSDN system. For simplicity, the term provisioning in this disclosure is used to present all similar procedures of provisioning and de-provisioning. The application provisioning procedures are usually triggered by the network administrator and are orchestrated by the fxManager, which works in collaboration with the fxDeviceApp-0 and fxCloudApp-0.

Figure 12:
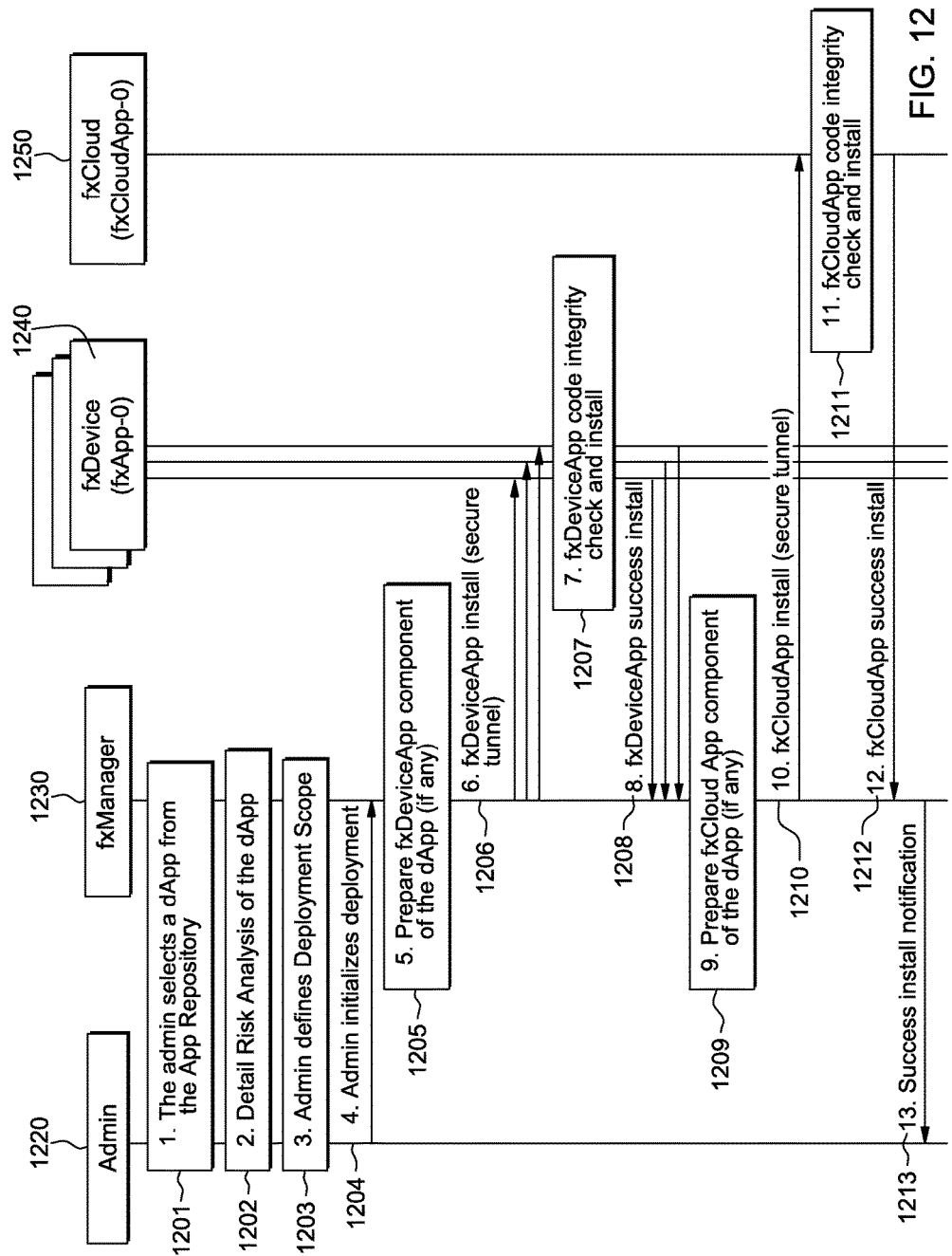
FIG. 12 shows an example procedure for Application Provisioning.

FIG. 12 shows an example procedure for Application (dApp) Provisioning. In step 1201, the network admin identifies the applications that would need to be installed in the dSDN system. These applications are already downloaded (from the fxStore or other sources) into the Application Repository (AR). Prior to installation in the live network, the authorized network admin 1220 has probably performed rigorous testing of the application in the test network. In step 1202, the fxManager 1230 performs a detailed analysis on the potential risks that this application may create on various parts of the network and other applications. The analysis tool uses the secure manifest file and other information to discover, for example, all the APIs used by the application, the required access-level authorization level for each of those APIs, requirements on the fxVF (inter-app, intra-app communication needs), and usage of platform resources including conflict discovery and resolutions. In step 1203, the admin defines the deployment scope that the application would be applied. Examples of deployment scopes could be a given zip code, a city, an administrative domain (zone), a shopping mall, an office building, or manual handpicking of sites or fxDevices 1240. The fxManager 1230 verifies compatibility of the OS version and resouces requirements of the application and the fxDevices 1240. If the fxManager 1230 discovers incompatibility, it informs the admin and request adjustment to the deployment scope or proposes upgrading incompatible fxDevice if possible. In step 1204, the admin 1220 initiates the installation process. In step 1205, the fxManager 1230 unpacks the dApp and if there is fxDeviceApp component, it would prepare it for submission to the fxDeviceApp-0 of fxDevices in the deployment scope. In step 1206, installation commands are sent to the fxDeviceApp-0s in a secure connection already set up as part of the fxDevice Commissioning. In step 1207, the fxDevice 1240 verifies the fxDeviceApp package and performs necessary integrity checks of the received software package. Once verified, the fxDeviceApp is installed and re-verified. In step 1208, the completion of successful install is sent to the fxManager 1230 by the fxDevice 1240. In step 1209, the fxManager 1230 prepares the fxCloudApp component of the dApp (if any). In step 1210, installation commands are sent to the fxCloudApp-0s in a existing secure connection. In step 1211, the fxCloud 1250 verifies the fxCloudApp package and performs necessary integrity checks of the received software package. Once verified, the fxCloudApp is installed and re-verified. In step 1212, the completion of successful install is sent to the fxManager 1230 by the fxCloud 1250. In step 1213, the fxManager 1230 informs the admin 1220 of the successful installation process.

Hot Upgrade Procedure

The Hot Upgrade refers to a procedure by which the software upgrades on the system have no or minimal implication on the functionalities offered by the software component subject to the upgrade process. Herein are presented two types of software upgrades. For simplicity, the use of the term upgraded in this disclosure represents both upgrade and downgrade since they both use identical processes. First, upgrade of applications on the fxDevice (i.e., fxDeviceApp) and fxCloud (i.e., fxCloudApp). Second, upgrade of core functions in the fxDevice (aka fxDeviceApp-0) or fxCloud (aka fxCloudApp-0).

The upgrade procedures for fxDevice and fxCloud are similar. Here, the focus is on the fxDevice upgrade process since it is technically more challenging due to stricter resource limitations in the fxDevice.

General Application Upgrade

Figure 13:
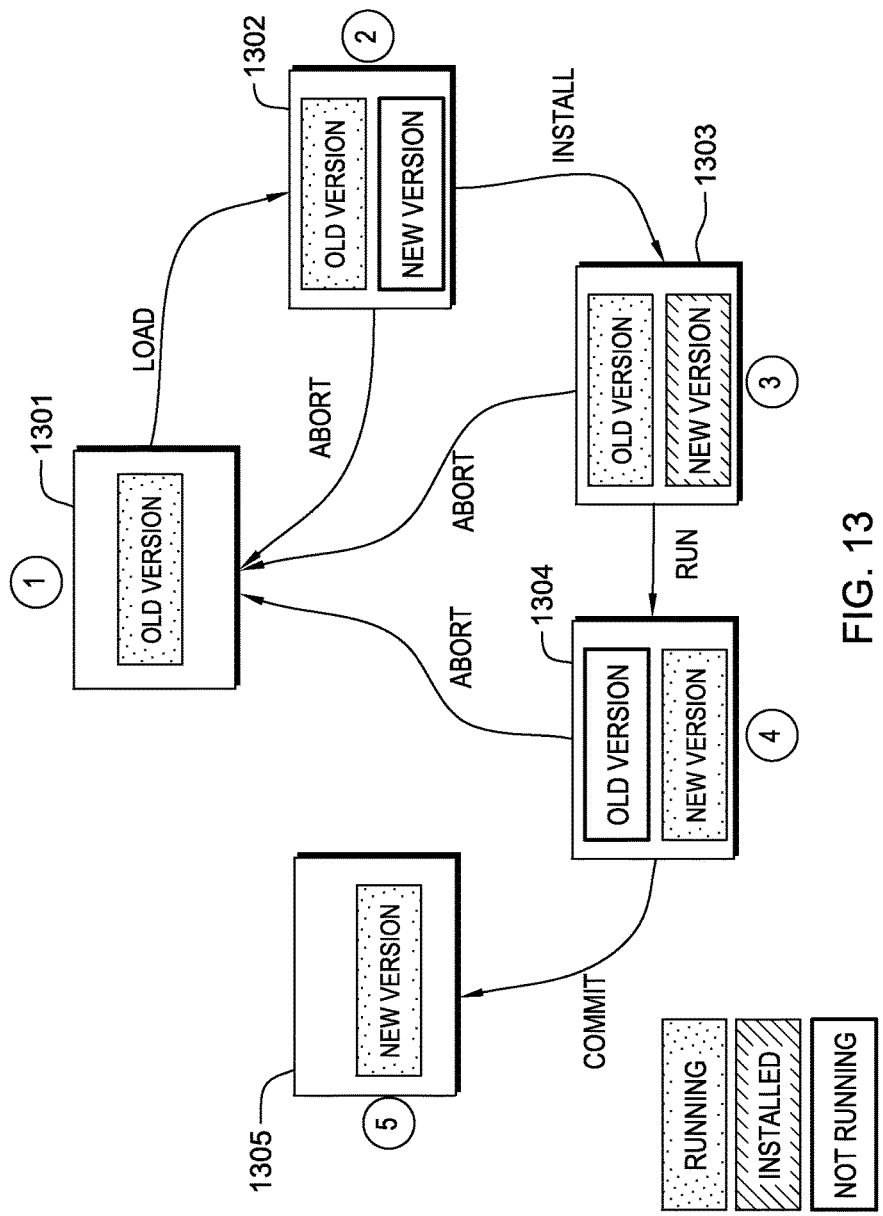
FIG. 13 presents the state machine for the application upgrade process.

The applications could be upgraded automatically or manually by the network admin. In either case, the installation of the upgrade follows a similar procedure as the Application Provisioning Procedure. FIG. 13 presents the state of the machine for the application upgrade process. In state 1301, the old version of the application is still running. In Load state 1302: the new version of the application is downloaded in the local storage while the old version is still running. In Install state 1303: the new version is installed (in the memory) while the old version is still running. In Run state 1304: the new version is activated taking charge of all the related data and application state and the old version is deactivated while still remaining in the local storage. In Commit state 1305: the old version is fully removed after ensuring the new version is running properly as expected.

fxDeviceApp-0 Upgrade

The fxDeviceApp-0 is a collection of software components that perform the core functionalities of the fxDevice. As a result, this hot upgrade is quite challenging. The most important thing is to ensure that major functionalities of the fxDevice (such as packet forwarding) remain intact during the upgrade process. The fxDeviceApp-0 upgrades may be categorized as:
No OS Kernel upgrade; or
OS Kernel upgrade.

No Kernel Upgrade

Figure 14A:
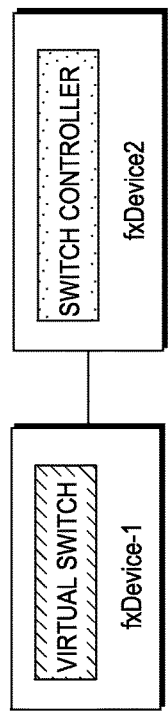
FIGS. 14A-14C are examples of the Distributed Switch Controller during Upgrade.
Figure 14B:
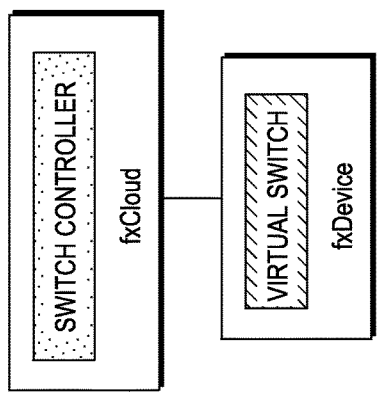
Figure 14C:
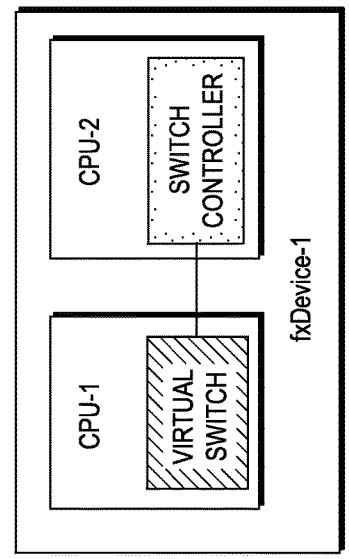

As described earlier, the packet forwarding function could be broken into the Virtual Switch and the Switch Controller. In order to maintain, the packet forwarding function, the Switch Controller function could be performed by another device or a second processor in the same device while the fxDevice is being upgraded. FIGS. 14A-14C demonstrate a few examples of distributed Switch Controller function during the upgrade. In some cases, it may be possible for the fxCloud to take over the Switch Controller function (FIG. 14A), or a neighboring fxDevice (FIG. 14B), or second CPU in the same fxDevice (FIG. 14C). The actual software upgrade procedure would be similar to Application Provisioning Procedure and the state machines are the same as the one shown in FIG. 13.

Kernel Upgrade

In this case, the packet forwarding process is mostly unavailable. Therefore, one potential solution might be for the fxDevice to redirect the entire bit stream to a neighboring fxDevice. In other words, the fxDevice would have just a bare minimum routing function working and the rest of the function would be performed by a neighboring fxDevice.

All the other upgrade procedures and state machines are similar to the ones performed for the No Kernel Upgrade process.

Virtual Fabric Service

Figure 15:
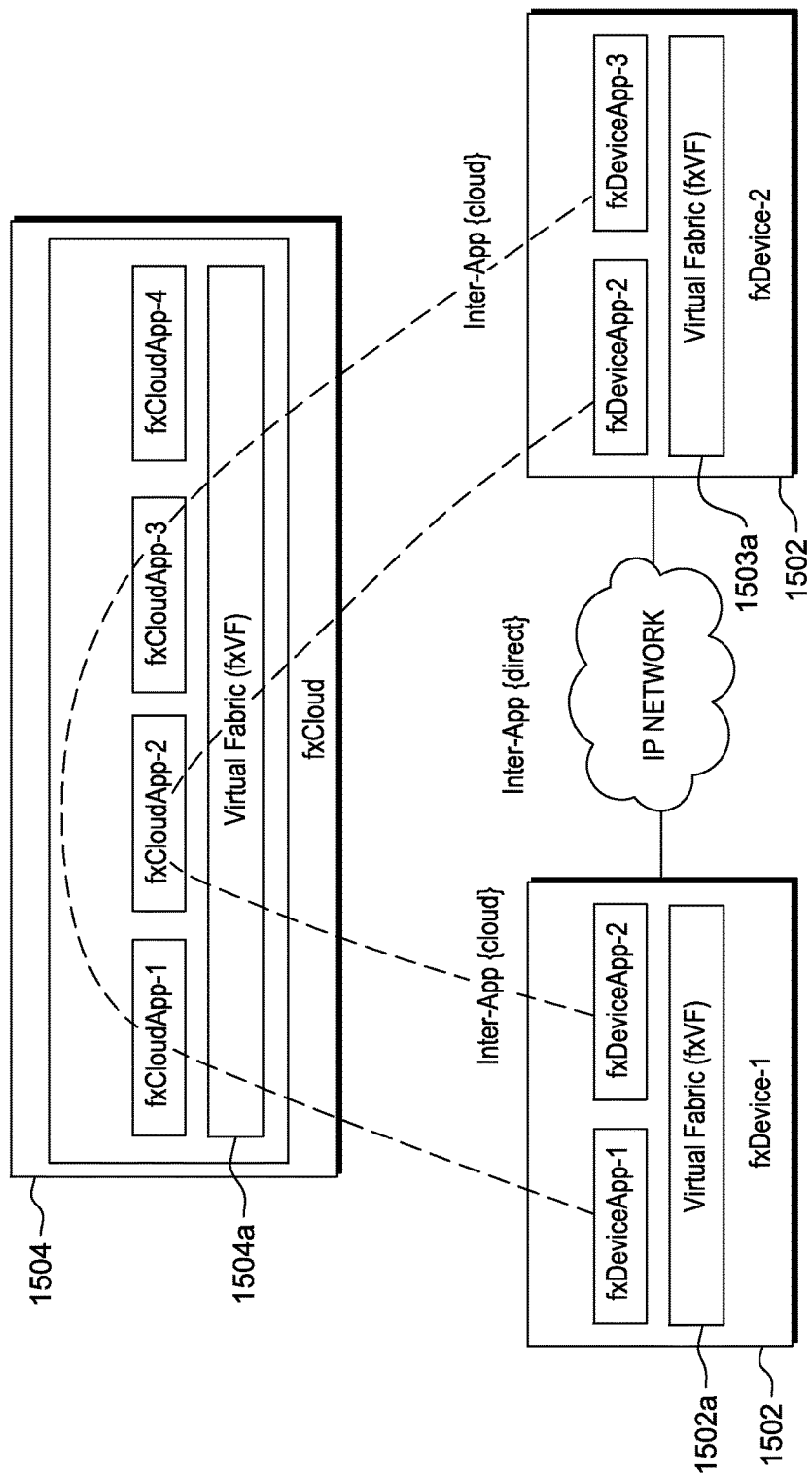
FIG. 15 shows how fxVF in the fxCloud and fxDevice.

The Virtual Fabric (fxVF) provides an abstraction layer for application to communicate with each other whether they are in the fxDevice or fxCloud. Various frameworks and services may use the fxVF service. FIG. 15 illustrates fxVF 1502a, 1503a, 1504a in the fxDevices 1502 and 1503 and fxCloud 1504. The fxVF 1502a, 1503a, 1504a may use Extensible Messaging and Presence Protocol (XMPP) for this messaging as the default protocol. It is important that the developers may use their own communication protocols between the fxDeviceApps 1502b, 1503b and the associated fxCloudApp 1504b. fxVF 1502a, 1503a, 1504a provide a secure routing mechanism.

Intra-App Messaging

This is an example of where one application in the fxDevice communicates with the same instance of the app in another instance of the same application in another fxDevice. The actual messages could go directly between the fxDevice or via the fxCloud. As an example, in the case of mobile networks, this messaging could be used to transfer user specific context from one eNB to another as a user hands off to a new eNB. In LTE, Private Messages on X2 interface could be used for messaging between the eNBs that act as the fxDevices.

Inter-App Messaging

In some cases, different applications may need to communicate with each other via their published APIs. In this case, the security policies set up by the network administrator determines which applications could communicate with each other for what purpose. The fxVF follows the security policies determined by the network administrator for inter-application communications.

Distributed Resources Service (dRS)

The resources could be platform resources or APIs offered by the applications. The fxCloud and fxDevice resources could include (as examples):
Firewall;
Data and statistics;
Storage (usually abundant at fxCloud);
Compute (usually abundant at fxCloud);
Load evaluator;
General settings;
Routing engine (usually relevant to the fxDevice);
Virtual Machine master controller (usually relevant to the fxCloud);
Power controller (usually relevant to the fxDevice); and
Wireless engine (usually relevant to the fxDevice).

Figure 16:
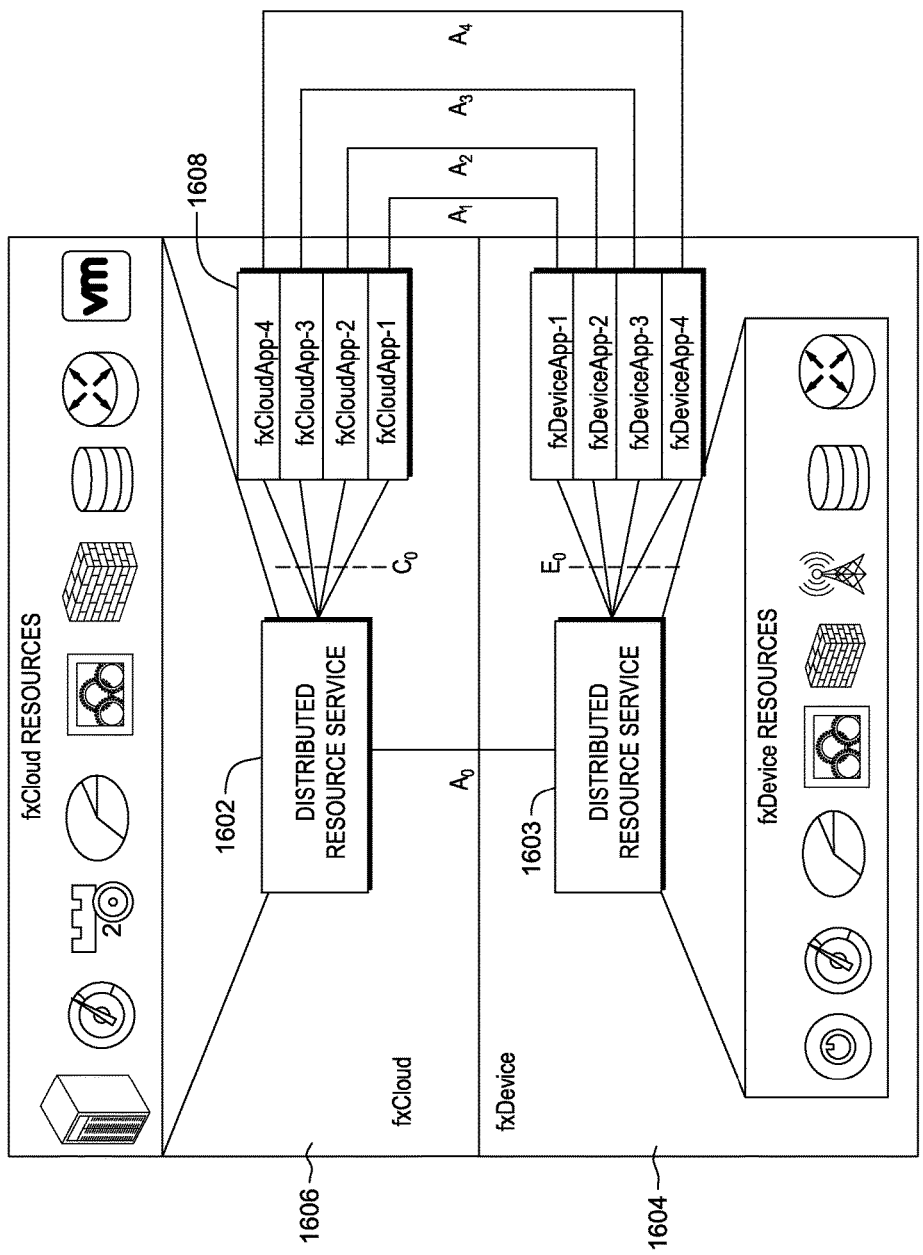
FIG. 16 demonstrates the logical interfaces between the platform resources and applications.

An app (fxDeviceApp or fxCloudApp) could expose APIs to be used by the other apps. The inter-app communication is enabled by the fxVF where the policy and security provisions are enforced. The APIs exposed may be RESTful (representational state transfer) and could travel across physical network elements. Since the fxManager defines fxVF policies, the administrator could ultimately specify which APIs between which apps could communicate with each other. FIG. 16 demonstrates the logical interfaces between the platform resources and applications. As shown in FIG. 16, the distributed Resources Service (dRS) 1602, 1603 comprises software agents residing in the fxDevice 1604 and the fxCloud 1606. These dRS agents manage the access to the platform resolutions (including potential configuration conflict resolution) as well as facilitating inter-app APIs. The dRS 1602, 1603 allows or disallows access to platform resource or inter-app communication according to the policies defined by the network administrator using the fxManager. In summary, the dRS 1602, 1603 provides services to application developers for:
Exposing APIs to other applications;
Configuring and managing platform resource;
Policy enforcement and authorization of applications access to platform resource and other app's APIs; and
Policy conflict resolution.

Distributed Content Service (dCS)

The distributed Content Service (dCS) allows the developers to seamlessly store and share the contents generated by one application with other applications and its associated application in the cloud. The dCS simplifies access to the data and brings in storage virtualization to the applications. In other words, the developers no longer would need to know where the data is actually stored (in the cloud or on the device) and would be able to access them easily. The dCS implementation may use Virtual Fabric (fxVF) and distributed Resources Service (dRS).

Distributed Notification Service (dNS)

The distributed Notification Service (dNS) is another potential tool for developers that could wake or ping an application when a particular event has occurred. For example, a load monitoring application could be notified when the CPU load on a particular fxDevice (or a target area) exceeds a certain threshold. In turn, such an exemplary application could make smart decisions on reducing the load on the CPU by forcing handoffs of users to neighboring cells (i.e. fxDevices). The dCS implementation may use Virtual Fabric (fxVF), distributed Resources Service (dRS) and distributed Content Service (dCS).

Cloud Breathing Procedures

Figure 17B:
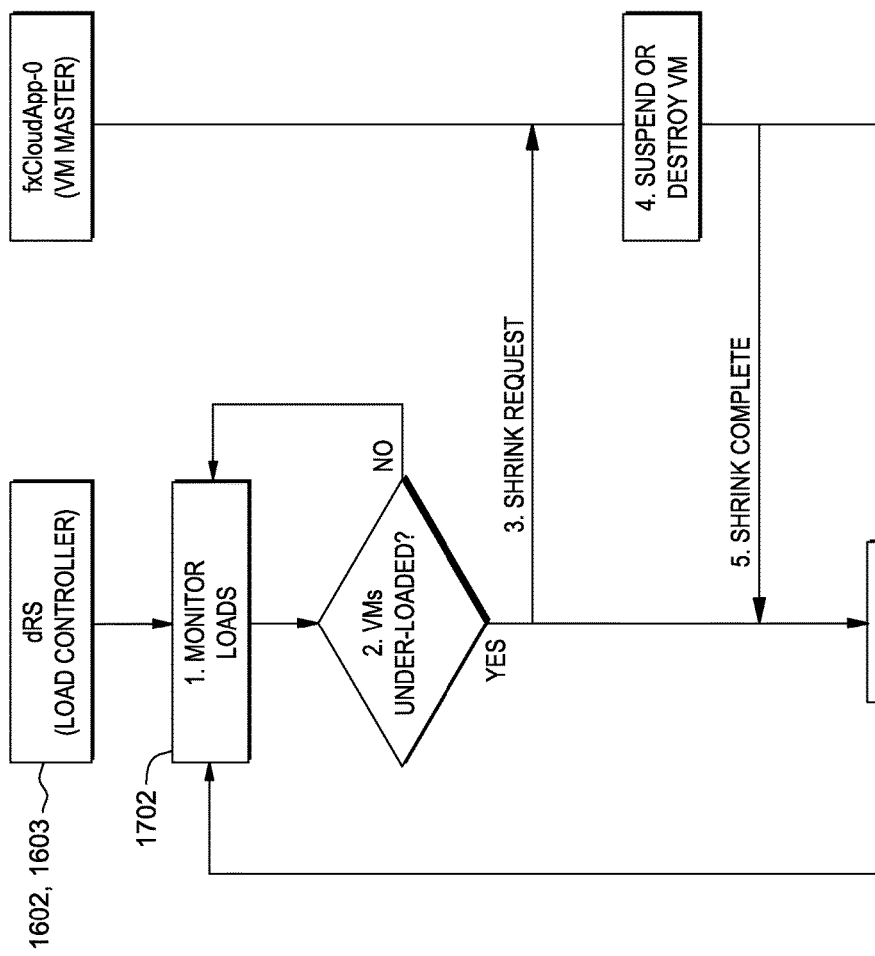

In general, resources (compute, storage) at the cloud are more abundant. However, software licensing costs and other limitation may require smart management of resources. The Cloud Breathing, here, is defined as a mechanism where the cloud resources are automatically expanded as load increases on the system or reduced as the load decreases. This creates an automatic elasticity in the cloud dimensions. FIGS. 17A and 17B demonstrate procedures for the cloud breathing. FIG. 17A is expansion and FIG. 17B is reduction. The Load Controller in the dRS 1602, 1603 could be used to monitor the load (step 1702) on the existing VMs (e.g. CPU or memory utilization loads). The VM Master of the fxCloudApp-0 1608 could effectively act on the decisions made by the dRS's Load Controller. Again, the network administrator via the fxManager defines the policies and thresholds for such decisions.

Security Aspects

The security aspects of this solution are of outmost importance in order to ensure quality in the product networks.

Identity

To create a security model, the dSDN network elements should have unique identities. The following identities may be defined:
fxDevice Identity (DID): this identity is unique globally and may be allocated at manufacturing and included in the X.509 digital certificate of the fxDevice;
fxCloud Identity (CID): this identity is unique to the NOIT domain and may be allocated by the network administrator and included in the X.509 digital certificate of the fxCloud;
fxDeviceApp Identity (DAID): this identity may be globally unique and may be allocated by the fxSDK at the point of code creation by a globally accessible server;
fxCloudApp Identity (CAID): this identity may be globally unique and may be allocated by the fxSDK at the point of code creation by a globally accessible server;
dApp Identity (AID): This identity may be globally unique and may be constructed by concatenation of DAID and CAID together;

Application Developer Identity (ADID): this is a globally unique identity allocated by a globally accessible server and may be included in the developer's X.509 digital certificate and is used to sign the final developed applications.

For addressability purposes, the identities may be presented in a URI format using the FQDN of the NOIT.

Access Level

The applications are given different access levels. The AL is used by the dRS to determine which APIs or class of APIs an application can access (e.g., a fxDeviceApp running on fxDevice should not be able normally to reboot the fxDevice). The required AL is generated by the fxSDK and included in the manifest files. It may also be published in the fxStore for that give application. A preset of ALs could be defined to categorize the applications security risks.

Software Security Verification

It is important for the target network element to verify the authenticity and integrity loaded software prior to install. The uniquely defined security keys of the application developers sign the applications. The following rules may be followed to ensure software security verification:

Only the verified OS/Firmware software can install on verified hardware;

Only the verified OS/Firmware software can run on verified hardware (continuous verification of essential parts of the software);

Only the verified fxDeviceApp software can install on verified hardware;

Only the verified fxDeviceApp software can run on verified hardware (continuous verification of essential parts of the software).

Each fxDeviceApp is accompanied by a manifest that is generated by the Integrated Device Electronics (IDE) at the time of compilation of the fxDeviceApp. The manifest file specifies which libraries and frameworks the fxDeviceApp uses.

The fxManager uses this information to determine the security risk of the fxDeviceApp as well as the required Access Level (AL) to run this fxDeviceApp. In order to ensure that manifest file is actually genuine manifestation of the fxDeviceApp and its integrity remains intact, a hashing algorithm could be used to generate a signature. An example is shown below:

Signature=HMAC-SHA256(K, Message);
where
Message=fxDeviceApp+Manifest
K=shared secret key between fxStore and fxManager.

The signature is generated by the IDE/fxSDK at the compile/build phase and is packaged with application binary and the manifest file. Once the distributed application package (dAP) is downloaded into the fxManager (Application Repository), the components of the signature, application binary, and manifest file are unpackaged. The fxManager then uses the same hashing algorithm to calculate the signature as above using the pre-shared key (K). If the calculated signature and the unpackaged signature match, it would prove the authenticity of the manifest file and the integrity of both manifest file and the fxDeviceApp.

Code Generation Process (Compilation):
fxDeviceApp compiled→Manifest file generation→Signature calculation Create fxDeviceApp Package Install Process (Consumption):
Un-package fxDeviceApp→Signature calculation→Signature comparison This model works if the key K can be shared with two trusted parties (fxManager and fxStore). The manifest file that is generated by the fxSDK shall be secured by integrity checks to ensure it remains intact throughout the transaction (i.e. from compilation to consumption).

Communication Security

Security mechanisms built into the fxDeviceApp-0 and fxCloudApp-0 forces the fxDevice to only use the configured fxCloud servers for Software Security Verification, fxDeviceApp downloads, and fxDeviceApp-fxCloud communication. Optionally, the fxDeviceApp-fxCloud communication can be customized per application requirements. One implementation of this interface could use SPDY Protocol or per-application VPN.

For the purpose of inter-App communication, an Inter-App Communication (IAC) policy template is applied to an fxDeviceApp that defied the communication policies between the fxDeviceApps and fxCloudApps. The network administrator may use one of the pre-configured IAC policy templates (exemplified below):

Isolated: this type of applications cannot communicate with any other application in the same fxDevice and does not have any associated fxCloudApp;

Isolated-Extended: this type of fxDeviceApps cannot communicate with any other fxDeviceApps in the same fxDevice but could communicate with its associated fxCloudApp;

Private: a private fxDeviceApp in one fxDevice could communicate with same private fxDeviceApps in other fxDevice but does not have any associated fxCloudApp;

Private-Extended: a Private fxDeviceApps in one fxDevice could communicate with same private fxDeviceApp in other fxDevice and has its associated fxCloudApp;

Community: a group of fxDeviceApps that belong to the same community can communicate with each other;

Promiscuous: a Promiscuous app could communicate with any other Promiscuous application and Community application;

Custom: the network administrator could create custom IAC Policy templates and could include (as examples):
Template name;
Inherited pre-configured template if any;
The protocols allowed to use for communication;
The maximum data rate allowed for inter-app communication between a pair of fxDeviceApps or between an fxDeviceApps and an fxCloudApp;
Policies related to the other fxDeviceApps in the same fxDevice, in other fxDevice, associated fxCloudApp and unassociated fxCloudApps; Policies related to direct fxDeviceApp to fxDeviceApp communication or relayed via fxCloud communication.

Secure Boot

The secure boot refers to a capability where the main boot code is in the fxCloud with the following exemplary procedure:

The Boot Loader (BL) in the fxDeviceApp-0 of the fxDevice looks for a particular DNS (DNSSEC) name of the fxCloud. The network administrator should define the DNS entry in their network. If there is a private fxCloud, the resolved domain name points to the fxCloud. If using shared cloud, the resolved domain name points to the cloud point of presence;

A secure tunnel (TLS) is created between the BL in fxDevice and the fxCloud using pre-burned X.509 certificate;

BL identify itself to the fxCloud and include System Information;

fxCloud determines the appropriate boot file and points the BL to the exact address of the boot file in the fxCloud;

BL downloads the correct boot file;

BL runs Software Security Verification;

BL reboots the fxDevice and the system will be ready for operation.

Frameworks

The following describes an example of the API Framework for the dSDN. Some APIs are purely local to the fxDevice or the fxCloud and some may be extended from the fxDevice all the way to the fxCloud using dRS.

General Framework

This framework refers to general libraries and APIs inherited from the legacy OS. An example of the legacy OS may be Embedded Android®. This framework allows for general processing and may be used for algorithmic applications.

Wireless Framework

The Wireless Framework adds a set up functions related to managing and controlling the wireless module. Table 1 highlights some examples of methods/functions that may be available in the Wireless Framework.

TABLE 1

Wireless Framework

| Method | Description |
| --- | --- |
| discoverNeighbors | Discovers wireless neighbors and returns their identities |
| retrieveNeighborInfo | Retrieves detail information of neighboring BS/AP information. This method may transparently call cloud servers to gather more information |
| measureInterference | Measures wireless interference observed on a frequency or a set of frequency channels |
| setWirelessConfig | Sets various parameters in the wireless module such as power, frequency channels, Multiple Input/Multiple Output (MIMO) antenna configuration, etc. |
| definePHYReceiverAlgorithm | Defines the physical layer receiver algorithm |
| connectedDevice | Returns details about the connected mobile devices (length of connection, data tx/rx) to a given wireless interface (channel, band, sector) |
| forceOffload | Offloads connected mobile devices to other access technologies (e.g. from cellular to WiFi) |
| homeAreaNetworking | Control of home automation wireless technologies such as Zig Bee or Z-Wave |
| setNeighborCells | Sets neighboring cells information |
| forceHandoff | Handoffs connected mobile devices to the same access technology but different channel or frequency |

TABLE 1-continued

Wireless Framework

| Method | Description |
| --- | --- |
| topMovers | Identifies the mobile devices with highest degree of mobility |
| positionDevice | Accurate positioning of mobile devices which may include geo-fencing data |
| borrowSpectrum | Allows one BS to borrow spectrum from another |
| configureMACScheduler | Configures the MAC scheduler (for example prioritize a particular user) |
| load Balance | Enables load balancing across radio channels |
| defineMACScheduler | Defines the MAC scheduler algorithm |

Security Framework

The Security Framework allows the developers to use a specialized security functions/methods. Some of these new methods may use the legacy OS frameworks. Table 2 highlights some examples of methods/functions that may be available in the Security Framework.

TABLE 2

Security Framework

| Method | Description |
| --- | --- |
| setDOSDetect | Detects DOS attacks on user plane as requested |
| configureFirewall | Provides firewall functions such as traffic filtering, permissions (this may use dRS) |
| defineDOSDetectAlgorithm | Allows replacing and redefining the DOS algorithm |
| encryptTraffic | Encrypts the content of a message or a class of traffic as reauested |
| authenticateUser | Authenticate users as requested |
| integrityCheckContent | Verifies authenticity of a message using its checksum information |
| configuresIPS | Configures IPS functions on the user plane |

FastPath Framework

The FastPath Framework allows the developers to identify and manipulate the data path with a DPI capability. Table 3 highlights some examples of methods/functions that may be available in the FastPath framework.

TABLE 3

FastPath Framework

| Method | Description |
| --- | --- |
| matchTraffic | Identifies and matches the traffic type requested by the developer |
| detectCongestion | Detects if there is congestion on the data path |
| identifyTopURLs | Identifies the most visited URLs by the users |
| detectLocalConversation | Detect conversations and packet routing between the end user on the same fxDevice |
| detectDevice | Detects traffic of a given mobile user device |
| redirectTraffic | Redirect data traffic to a given network element. The traffic may be identified with a user or a class of traffic |
| connected Devices | Returns all the connected mobile devices to a given fxDevice |
| assignAddress | Allocates a particular IP address to the mobile device |
| setPriority | Set traffic priority to a class of traffic |
| markTraffic | Marks the user traffic with the desired QoS tags |

TABLE 3-continued

FastPath Framework

| Method | Description |
|---|---|
| setupTunnel | Sets UP data tunnel from fxDevice to a destination |
| Adscript | Adds a JavaScript to an active transiting web page |
| detectIdenticalFlows | Identifies the identical flows coming from the WAN/uplink interface on the fxDevice |
| aggregateFlows | Enables aggregation of flows to save WAN/uplink utilization |
| routeTunnel | Routes a packet or a class of traffic onto an established tunnel |
| identifyTopDevices | Identifies users that generate most traffic load |

Messaging Framework

The Messaging Framework allows the developers to send messaging between the applications residing in the fxDevice and fxCloud. Table 4 highlights some examples of methods/functions that may be available in the Messaging Framework.

TABLE 4

Messaging Framework

| Method | Description |
|---|---|
| sendIntraApp | Sends an Intra-App message from one fxDevice to another |
| sendInterApp | Sends an InterApp message from one application to another |
| sendfxCloud | Sends a message to the fxCloud |
| sendSMS | Sends an SMS to the user of choice |

Caching Framework

The Caching Framework allows the developers to cache particular contents or files that are accessed frequently in the caching engine. The caching can be done locally in the fxDevice, clustered cache (shared amongst a few fxDevice), or cloud caching. Table 5 highlights some examples of methods/functions that may be available in the Caching Framework.

TABLE 5

Caching Framework

| Method | Description |
|---|---|
| storeForward | Enables Store and forward model for a target class of traffic where the target traffic is matched and stored upon a condition and forwarded the condition is relieved |
| cacheWebSite | Caches the most visited web sites |
| cacheVideo | Caches the most viewed videos |
| cacheCloud | Caches the requested content or traffic type in the cloud storage in fxCloud |

Management Framework

The Management Framework enables the developers to manage the BS platforms and perform administrative procedures. Table 6 highlights some examples of methods/functions that may be available in the Management Framework.

TABLE 6

Management Framework

| Method | Description |
|---|---|
| upgradeFirmware | Started and executes the firmware upgrade procedure on the fxDevice |
| upgradeOS | Started and executes the operating system upgrade procedure on the fxDevice |
| remoteBootup | Performs remote boot up process where the fxDevice works closely with the fxCloud to perform the bootup |
| remotePower | Allows fxCloudApps to remotely turn on and off a fxDevice or elements in the fxDevice (e.g. the wireless) |
| gatherStatistics | Instructs fxDevice to gather specific statistics. Various commands may be consolidated for gathering statistics. Number of active users Stats of time spent by users in the cell Stats of quality perceived by the users Neighboring cell info Overall traffic passed through the system Total number of connected devices per frequency, per carrier, per site, per location Handover failure statistics Cloud aggregated data processing and full report Total traffic passed Applications used (meta-data correlated) Bandwidth consumed User's mobility pattern |
| setMonitonng | Allows the developer to get reports and statistics of thef xDevice traffics, errors, and neighboring environment. The reporting criteria could be set up as: 1) Period, 2) Event based (reports only if a threshold is passed; a threshold could be based on absolute numbers or deltas), 3) One-time (i.e. the information is pulled once). The exact parameters to get report on may use the same data structures used by the method "getStatistics". |
| getSystem Info | Retrieves static and dynamic system info such as: Hardware info: vendor, model number, capability profile. GPS, Cellular, WAN interfaces, RFID/NFC Heat temperature Vendor Specific Information Software info: OS version, firmware information CPU load, per-application load (CPU, memory, accelerators) Loaded apps and status Memory utilization Storage utilization Interface status & utilization (RF, backhaul, management . . . ) |
| getfxDeviceLocation | Retrieves location of the fxDevice Location would be presented in GPS coordinate sand civil address Location enhancement: Cloud, map data, and neighbor discovery could help more accurate positioning |
| getPowerConsumption Rate | Retrieves current power consumption rate of the fxDevice |
| configureWAN | Configures the WAN settings |
| retrieveNeighborInfo | Retrieves neighbor information from the fxCloud |
| getRFIDInfo | Returns the RFID/NFC information of the fxDevice |
| setRFIDInfo | Sets the RFID/NFC information of the fxDevice |

Extensible API Framework

This framework allows the developer to create custom APIs and make it accessible for other applications (in the fxDevice or in the fxCloud). In turn, the fxCloud could present these APIs using e.g. REST technologies (via the fxCloud Northbound Interface) to the developer outside the dSND system. There might be limits put on the APIs exposed through the cloud to avoid potential misuse or security threats. The dRS enforces the security policies defined by the admin (via fxManager). The applications take a role of Client Application (CA) or Server Application Role (SA). The CA and SA could be distributed in the fxDevice or fxCloud. The CA makes requests and SA serves the requests.

The Extensible APIs could be categorized (as examples) into:
- Read-Only Data: this type of APIs allows a CA to read data from SAs without the ability to change or request any particular action from the SAs
- Read-Write Data: this type of APIs allows CA application to read data from SAs with the ability to change some of their data but no option for requesting any particular action from SAs;
- Procedural: this type of APIs allows CAs to execute a particular procedure in SAs. The rights to change any data still depends on whether the API allows Read-Only Data or Read-Write Data types.

Cloud Management Framework

The Cloud Management Framework presents a collection of methods enables management of the cloud services and resource. Table 7 highlights some examples of methods/functions that may be available in the Cloud Management Framework.

TABLE 7

Cloud Management Framework

| Method | Description |
| --- | --- |
| detectCloudCongestion | Detects congestions on a particular VM |
| deleteVM | Deletes an active VM permanently |
| suspendVM | Suspends an active VM but doesn't remove it |
| activateVM | Activates an already created VM |
| createVM | Creates a new VM but doesn't activate it |

Examples of dApps

The dSDN create an end-to-end programming platform and the possibilities of vApps are only limited by the developers' imagination. An example list of potential vApps are presented in Table 8 below.

TABLE 8 highlights examples of use cases possible by the Distributed Software Defined Network (dSDN)

| Use | Description | Framework {Methods} used |
| --- | --- | --- |
| 1 | Distributed SON: For example, the WiFi AP could search for the least crowded channel to minimize the interference | Wireless {discoverNeighbor, retrieveNeighborinfo, measure nterference, setWirelessConfig, loadBalance}, General Framework, Messaging {sendIntraApp} |
| 2 | BS Hot Firmware Upgrade without impact to the basic functions of the BS. For this function to support full hot upgrade without operational impact the Communication SoC should be able to support/have dual processor. | Management {upgradeFirmware} |
| 3 | BS Hot infOS Upgrade without impact to the basic functions of the BS. For this function to support full hot upgrade without operational impact the full platform should have dual processor. | Management {upgradeOS} |
| 4 | Secure network-based booting. This allows to keep the code securely in the cloud to avoid tampering by the ODM/CM or Man-in-the-Middle attacks. | Management {remoteBoot} |
| 5 | Turning on or off APs if nobody is in the office. Sensors in the building send information to fxCloudApp which in turn orders power control of the APs. | Management {remotePower} |
| 6 | Store and forward model for low priority M2M applications where the target traffic is matched and stored in the case of network congestion and forwarded once the network congestion is relieved. | DataPath {matchTraffic, detectCongestion}, Cache {storeForward} |
| 7 | Replacing MAC Scheduler. | Wireless {defineMacScheduler} |
| 8 | Replacing Receiver Algorithms. | Wireless {definePHYReceiverAlgorithm} |
| 9 | Caching most visited website or video clip in the enterprise | DataPath {identifyTopURL}, Cache {cacheWebSite} |
| 10 | The most viewed videos and webcasts are cached in the wireless edge. | DataPath {identifyTopVideos}, Cache {cacheVideo} |
| 11 | Local Routing: data and voice sessions between two parties on the same cell are routed within the same cell bypassing the core Network. | DataPath{detectlocalConversation, Routelocal} |
| 12 | Local Routing: data and voice sessions between two parties on the nearby cells are routed locally bypassing the core network. | DataPath{detectConversationDetect, routelocal} |
| 13 | Temporary redirection of a data flow for monitoring and security reasons. In this use case, a particular user's traffic is tracked by redirection to a monitoring station. If user is mobile, such profile of tracking and associated redirection is transferred from fxDevice to fxDevice either directly or via the fxCloud. | DataPath {detectDevice, matchTraffic, redirectTraffic} |
| 14 | Power Calendar: On-demand coverage (triggered by passing traffic thresholds in certain cells or by calendaring): Operators need to design their network for peak usage rates at high costs, leaving their network underutilized most of the time. | DataPath {detectCongestion}, Management {remotePower} |
| 15 | DOS attack recognition and action could be blocking the user, the app, and/or notifying the user via an SMS message. | Security {setDOSDetect, configureFirewall}, Messaging {sendfxCloud} |

TABLE 8-continued highlights examples of use cases possible by the Distributed Software Defined Network (dSDN)

| Use | Description | Framework {Methods} used |
|---|---|---|
| 16 | Applying certain ACLs to the BS. For example, the students in the class can only access Facebook between the breaks and access to Facebook is blocked during the class. | Security {configureFirewall} |
| 17 | Forced offloading of some cellular users (users that have attached to the same cell for a while) to WiFi by changing "something" in the cellular connection to force WiFi connection (Heterogeneous). | Wireless {identifyConnectedDevice, forceOffload} |
| 18 | Service continuity and anchoring at eNB for WiFi using the same LTE IP address (Heterogeneous). | DataPath {identifyConnectedDevices, assignAddress} |
| 19 | Graphic/general processing for special use cases such as City BS. | General Frameworks |
| 20 | Application filtering/throttling (secondary conditions: time-based, location-based, subscriber-type, none). | DataPath {matchTraffic}, Security {configureFirewall} |
| 21 | Local Services: The enterprise user can discover Bonjour or UPnP devices and services (e.g. printer) even when connected to LTE/3G small-cell in the enterprise. In this case, the small cell or fxDevice pro-actively listens to Bonjour and UPnP discovery and advertisement messages (SSDP) and cache the available services until a device request for such information. In the case of Bonjour, fxDevice could listen to Multicast DNS (mDNS) messages sent over cellular connection (LTE/3G) and multicast them on the LAN or WLAN interfaces. | DataPath {matchTraffic, routelocal} |
| 22 | Local Services: The premise-owner (e.g. airport, hotel) can provide ads under the browser for sponsored WiFi or cellular (3G/LTE) access over multi-mode small cell. The premise owner could use this service to advertise special offers or third party ads. This technique uses HTML <script>for example to add special content to the bottom of the page. | DataPath {matchTraffic, addScript} |
| 23 | Distributed Content Distribution Network (CDN). In this use case, the fxDevices function as CDN that bring the contact closer to the end users. | DataPath {matchTraffic}, Cache {cacheVideo} |
| 24 | In case of national security, the service provider may limit the access to the network so only the law enforcement can use the cellular network. In this case, the admin defines a Target Area (TA) using an fxCloudApp in the fxCloud where the emergency lockdown needs to be applied. The IMSI/MSISDN number of law enforcement mobile devices are sent to the fxDevice in the TA which in turn enforce the policy. The policy may allow the public to just sent SMS while the law enforcement could have full access and priority to the system. | DataPath {matchTraffic, setPriority}, Security {configureFirewall} |
| 25 | Emails and web browsing monitored by the cloud services assisted by the agent in the dSDN network. In this case, the fxDevice detects certain traffic (email or web in this case) and redirects them to a cloud service for security cleansing. | DataPath {matchTraffic, redirectTraffic} |
| 26 | Analytics pre-analysis: The data collected from M2M devices could be processed (noise could be filtered out) and packaged (compressed) for consumption by cloud services. | DataPath {matchTraffic}, General Framework, Messaging {sendfxCloud} |
| 27 | Certain traffic could be marked with QoS DSCP codes for further processing in the network. | DataPath {matchTraffic, markTraffic} |
| 28 | Proprietary SP services and applications that run purely between the phone and the BS. For example, the SP may implement a certain application for the law enforcement to get direct feed of surveillance cameras in a target area (TA). | DataPath {matchTraffic}, Security {configureFirewall}, General Framework |
| 29 | IP-PBX implementation in the small-cell or WiFi AP for enterprise use. This would allow a simple out of a box solution. The VoIP phones connect to the fxDevice via the LAN connections. The WAN connection could connect to an fxCloudApp for PSTN calls. | DataPath {matchTraffic}, General Framework |
| 30 | Network management system can add its own agent/probe to collect and consolidate data and transmit it to its cloud element using any protocol. | Management {gatherStatistics, getSystemInfo, control}, General Framework |
| 31 | Application based performance monitoring on the wireless link (number of packets sent in idle mode, retransmit rate . . . ). Such information could be shared with the app developer to optimize its application. | Management {gatherStatistics}, General Framework |
| 32 | Seamless network sharing and mergers. This is the case where two Network Operators would like to share or merge their network. Using dSDN's infManager, the network administrators could merge the network administration control. This process may include setting up the desirable default fxApp packages of the network operator. | fxManager Portal Service |
| 33 | Following a user to understand where it faces coverage issues or call drops. Once discovered, the system could send a message to the user acknowledging an issue and that the SP is trying to fix this. The information is uploaded to the cloud for further analysis. | Management {gatherStatistics}, General Framework, Messaging {sendSMS} |
| 34 | Reporting: This allows the developer to get reports and statistics of the fxDevice traffics, errors, and neighboring environment. The reporting criteria could be set up as: 1) Period. 2) Event based (reports only if a threshold is passed: a threshold could be based on absolute numbers or deltas, 3 One-time (i.e. the information is pulled once). | Management{setMonitoring}, General Framework |

TABLE 8-continued highlights examples of use cases possible by the Distributed Software Defined Network (dSDN)

| Use | Description | Framework {Methods} used |
|---|---|---|
| 35 | Proprietary security protocol between the application in the mobile device and the BS in enterprise deployment. This would allow SP to create enterprise-class LTE for indoor using small cells. | Security {encryptContent, authenticateUser, Integrity, configureFirewall}, DataPath {Routelocal}, General Framework |
| 36 | The femto cell at home that can't scan neighboring cells, gets a list of neighboring cells from the fxCloud or neighbors to broadcast to improve outbound handoffs. | Wireless {discoverNeighbors, retrieveNeighborInfo, setNeighborCells}, Managment {retrieveNeighborInfo} |
| 37 | IMS-capable femto enabling various SP services to initiate or transferred between home network and mobile devices. | Messaging {sendfxCloud}, General Framework |
| 38 | Integrated smart home with multi-mode femto/WiFi router. For example, the application in the smart home router (fxDevice) allows for coordination of home physical security service (such as ADT services). With the fxCloudApp, the user could control the security status of his/her home and remotely control the settina of the service. | Wireless {homeAreaNetworking}, Messaging {fxCloud}, General Framework |
| 39 | Home CCTV DVR implementation in an integrated home router. The camera feeds arerecorded on the same router caching engine. | Cache {cacheVideo}, Messaging {sendfxCloud}, General Framework |
| 40 | Enterprise CCTV DVR implementation in an integrated router with cloud backup. The camera feeds are recorded in the cloud. | Cache {CacheVideo, CacheCloud}, Messaging {fxCloud}, General Framework |
| 41 | User traffic separation into various MPLS/LSP (integrating VPN and BS). In this case, users are classified into groups and each group is tunneled to the core network. For example, law enforcement use the encrypted tunnel while the other users use the default tunnel. | DataPath {Match, SetupTunnel, RouteTunnel} |
| 42 | Dynamic spectrum allocation where a BS borrows unused spectrum from the neighboring BS in case of temporary congestions. | DataPath {detectCongestion}, Wireless {discoverNeighbors, setWirelessConfig}, Management {retrieveNeighborInfo, borrowCarrier}, Messaging {fxCloud} |
| 43 | Proxy ANDSF (Access Network Discovery and Control Function) in the BS. When the UE tries to access the ANDSF, the Proxy ANDSF fxDeviceApp in the BS intercept the ANDSF messages and replies on behalf of the ANDSF. This would speed up the WiFi network discovery for example. | DataPath {matchTraffic}, General Framework, Messaging {sendfxCloud} |
| 44 | HD Audio calling: audio codecs in BS allows the phones with the right capabilities to communicate with HD Audio quality calling. If one of the mobile devices can't handle the HD quality audio, the BS performs the transcoding of the audio. | DataPath {matchTraffic}, General Framework |
| 45 | Enabling mobility on White Space Spectrum: The latest white space database will be downloaded. The mobile devices with special software applications make requests to the BS to retrieve the local available white space frequencies. This would allow the mobile device to handoff seamless between BS using the white space spectrum. The BS would advertise such a capability to the UEs. The secure communication allows peer-to-peer communication between the UE and the BS for certain applications such as White Space Channel lookup or site acquisition tools for field engineering and RF planning. | Messaging {sendfxCloud}, General Framework |
| 46 | Site acquisition tool where the technician uses a software tool on his mobile phone to interact with BSs to determine the best place to deploy the new BS. The phone app interests with fxDeviceApps in BSs and fxCloudApp. For example, fxDeviceApp performs air interface quality and gives a priority to traffic generated by for this purpose. | Messaging {sendfxCloud}, General Framework, DataPath {matchTraffic, setPriority} |
| 47 | DNS caching at BS to accelerate DNS lookup for subsequent users. This would improve the user experience by reducing response delays. | DataPath {matchTraffic}, General Framework |
| 48 | Continuous SLA monitory for certain protocols, applications or general link quality for jitter, delays, bandwidth. | DataPath {matchTraffic}, Management {gatherStatistics}, General Framework |
| 49 | Enterprise users can use the small cell deployed in their enterprise free of charge. The DPI engine in fxDevice classifies the traffic and identifies the enterprise private data and they would be routed locally and charging records are generated by the BS (the SP decides how to bill the enterprise user and it may decide to make such usage free charge. | DataPath {matchTraffic, routelocal} |
| 50 | On-premise small-cell aggregation where on fxDevice takes the responsibility of aggregating multiple small-cells on the premise and presenting them as a single BS/Node-B/eNodeB to the core network. In this case the aggregating fxDevice (AfxE) may take responsibility of local radio resource manager (RRM) or self-optimizing network (SON) server. AfxE can also implement and enforce policies concerning local service access on the premise (enterprise) as well as enable seamless handover between cellular technologies and on-premise (enterprise) local area network (LAN) for example using WiFi technology. | General Frameworks, Wireless {discoverNeighbors, retrieveNeighborInfo, setNeighborCells, setWirelessConfig}, Messaging {sendIntraApp} |
| 51 | Self adjusting fxCloud compute resources: The fxCloud creates and tears down virtual machines (VMs) based on the traffic load measured by itself or the packet processing and data plane engine. It is also possible that the VM adjustments are made based on the | CloudManagement {removeVM, createVM, detectCloudCongestion, actiavteVM, suspendVM} |

TABLE 8-continued highlights examples of use cases possible by the Distributed Software Defined Network (dSDN)

| Use | Description | Framework {Methods} used |
|---|---|---|
|  | rush hour or pre-configured hours of the day or manually by the administrator. |  |
| 52 | Core Network Function Virtualization (cNFV) using distributed Software Defined Networking(dSDN): In the case, once an fxDevice is commissioned, its fxDeviceApp0 (i.e. firmware) uses predefined DNS names to discover the rest of the core network (e.g. MME, S-GW etc). | General Frameworks, Messaging {sendInterApp, sendIntraApp}, CloudManagement {deleteVM, suspendVM, createVM, activateVM, detectCloudCongestion} |
| 53 | Smart display and digital signage as wireless base stations: this use case allows combining the capabilities of a base station and the smart display in shopping malls, airports, and enterprises. There is a already electric power and connectivity for the smart display that the base station function could use. | General Frameworks |
| 54 | Tracking a mobile user at base station level even if the UE is in the idle mode. Currently in the idle mode, the MME, SGSN, or VLR/MSC can only know the location of the UE in with a accuracy of LA/RA/URA which is a very large area. The administrator uses the fxCloudApp and requests tracking of the user/UE (the admin may provide target area where the user/UE may be located; e.g. zip code or town name). The fxCloudApp contacts its fxDeviceApp in the fxDevices in the target area (TA) requesting information of a particular IMSI/MSISD/TMSI. Once an fxDevice responds indicating knowledge of the user location, the fxCloudApp directs that serving fxDevice to inform the fxDeviceApp in the next fxDevice of the instructions to track the user and contact fxCloudApp when they user hands off to due to its mobility. fxCloud could create user friendly interfaces and presentations to show for example the direction the user is moving, predict next location of the user, and estimate arrival of the user to a certain location. | DataPath {matchTraffic}, Messaging {sendIntraApp, sendfxCloud} |
| 55 | In case of emergency, fxDevices in a target area block all public traffic and only allow law enforcement sessions using specially encryption and authentication between the UE and the fxDevice or fxCloud (depending on the requirements). | DataPath {matchTraffic, setPriority}, Security {configureFirewall, encryptTraffic, authenticateUser}, General Framework |
| 56 | SON triggered by the data traffic consumption. In this case, the mobile cell configuration is adjusted based on the current traffic of the cell. It could for example force handoff some users (high users or users moving fast) to neighboring cells. | DataPath {identifyTopDevices}, Wireless {forceHandoff} |
| 57 | Time based QoS and policy. In this use case, the infManager pushes certain policies in target area (TA). Such polices could be turning on extra capacity (frequency channels) or QoS policies and traffic prioritization on the WAN. | DataPath {matchTraffic, setPriority}, Wireless {discoverNeighbors, setWirelessConfig} |
| 58 | Fast moving users detection: in this use case, the application in the BS measures the speed of the user (based on the time was handed off to this cell until it was handed over to the next cell). This information could be used by the fxDevice or fxCloud to force handoff the mobile user to a larger cell to reduce handoff rates. | General Frameworks, Wireless {identifyTopMovers, forceHandoff} |
| 59 | Emergency broadcast of information and live camera feeds. In case of emergency, the enterprise network administrator temporarily block all traffic and only allow emergency related traffic across the target area in the enterprise network. For example, the network admin broadcasts the camera feeds and alerts over the WiFi access points using multicast IP techniques. The client devices and digital sinages can listen to that particular multicast and show the camera feeds and emergency alerts. | DataPath {matchTraffic, setPriority}, Security {configureFirewall}, General Framwork |
| 60 | Dynamic advertising in shopping malls. The shopper would use an app from the shopping mall. When the shopper brings up or refreshes the app, the dSDN allows the shopping mall to pinpoint the exact indoor/outdoor location of the user (e.g. the shop the shopper is in) and send special coupon and ads for that store to the shopper. | General Frameworks, Wireless {positionDevice}, Messaging {sendIntraApp, sendfxCloud}, Security {configureFirewall}, DataPath {matchTraffic, redirectTraffic} |
| 61 | Smart tour guide. The tourist would use an app from the tourism board or museum. When the user brings up or refreshes the app, the dSDN allows to pinpoint the exact location of the tourist (e.g. the painting he/she is looking at) and send tour guide information (e.g. audio video hypertext). | General Frameworks, Wireless {positionDevice}, Messaging {sendIntraApp, sendfxCloud}, Security {configureFirewall}, DataPath {matchTraffic, redirectTraffic} |
| 62 | General hotspot landing page | DataPath {matchTraffic, redirectTraffic}, Security {authenticateUser} |
| 63 | Proprietary wireless mesh implementation | Wireless {discoverNeighbor, retrieveNeighborInfo, measureInterference, setWirelessConfig}, Framework,Messaging {sendIntraApp} |
| 64 | Power and energy consumption map of the network. A real-time fxCloudApp pulls the power consumption details from each fxDevice periodicaly or on demand. The pulled data then are combined with the location information and correlated into a map to present a viewable consumption map. | Management {getfxDeviceLocation, getPowerConsumptionRate} |
| 65 | Network deployment optimization. This application allows network operator to get advice for best optimal reconfiguration and/or redeployment of the network. For example, the network admin could | Management {getfxDeviceLocation, getPowerConsumptionRate, gatherStatistics} |

TABLE 8-continued highlights examples of use cases possible by the Distributed Software Defined Network (dSDN)

| Use | Description | Framework {Methods} used |
|---|---|---|
| | get suggestion that based on the power consumptions and coverage perceived and spectrum utilization, it might be better to replace a particular group of smaller cells with a single macro-cell. This app could also pull information from larger OEMs based on the subject deployment scenario (the OEMs either provide this information statically to the tool or provide network APIs for use by this app e.g. using REST protocol). | |
| 66 | High availability. This app allows two or more fxDevice to form a redundancy cluster where they participate in statueful redundancy and load-balancing. | Messaging {sendIntraApp}, General Framework |
| 67 | Bandwidth Bursting. This feature enables the dynamic adjustment of backhaul or WAN link bandwidth as the demands change in the enterprise or public wireless deployments. In this case, the fxDeviceApp in the fxDevice monitors the WAN link utilization, once a preset threshold percentage has reached, it messages its sister fxCloudApp which in turn would send a request to the fxDeviceApp to increase or decrease the WAN bandwidth. If additional backend reconfiguration is needed, the fxCloudApp performs those additional changes prior to informing the fxDeviceApp of the bandwidth changes. | Management {getStatistics, configureWAN} |
| 68 | Wireless link quality measurement by the small-cell or WiFi AP: The wireless SoC in the small-cell or WiFi AP continuously monitors the link quality for power adjustment and handover reasons. Such information could be exposed to the app developers to create cell-level analytics and reports without the need to have test-drives or field testing of service quality. | Management {gatherStatistics}, General Framework |
| 69 | Data Path Consolidation: An application on the fxDevice discovers identical data feeds from a cloud server to two or more users. The fxDeviceApp in the fxDevice can discover this potential duplicate flows at the session establishment (via a proxy function) and it would consolidate those sessions into one on the uplink towards the cloud server. A good example of this use case is the web-based desktop sharing where different many users in the same office site get the same feed from the cloud server. | FastPath {detectIdenticalFlows, aggregateFlows} |

The following references are herein specifically incorporated by reference in their entirety into this disclosure:
[1] 3GPP TS 23.002, "Network Architecture";
[2] 3GPP TS 23.402, "Architecture enhancements for non-3GPP accesses";
[3] 3GPP TS 23.401, "General Packet Radio Service (GPRS) enhancements for Evolved Universal Terrestrial Radio Access Network (E-UTRAN) access";
[4] Open Base Station Architecture Initiative (OBSAI); and
[5] SPDY Protocol (http://datatracker.ieff.org/doc/draft-mbelshe-httpbis-spdy/).

The invention claimed is:

1. A system for processing data packets in a mobile data wireless network, the system comprising:
a programmable network device hosting a plurality of first network applications and located at a wireless edge of the mobile data wireless network;
a programmable cloud device hosting a plurality of second network applications and located in a core of the mobile data wireless network;
wherein at least one of the plurality of first network applications in the programmable network device and at least one of the plurality of second network applications in the programmable cloud device are in secure communication with each other to form a distributed application;
the programmable network device is powered by a sandboxing operating system which facilitates deployment of the plurality of first network applications independent of hardware vendor associated with the programmable network device, and facilitates hot upgrade of the plurality of first network applications with substantially no interruption to operation of the programmable network device;
wherein the programmable network device verifies authenticity and integrity of upgrades to the plurality of first network applications and the programmable cloud device verifies the authenticity and integrity of upgrades to the plurality of second network applications and wherein the verification is based on unique security keys associated with each of the plurality of first and second network applications;
wherein the programmable network device and the programmable cloud device form unified capabilities using a plurality of application programming interfaces (APIs) wherein the APIs accessible to each of the plurality of the first network applications and the plurality of second network applications are determined based on a respective access level associated with each of the plurality of first and second network applications;
an application repository storing distributed applications which have been tested and certified for installation in the programmable network device and programmable cloud device; and
an application management portal coupled to the programmable network device, the programmable cloud device and the application repository, wherein the application management portal presents a user interface to manage provisioning, usage and de-provisioning of the distributed applications on the programmable network device and the programmable cloud device.

2. The system of claim 1, wherein each of the programmable network device and programmable cloud device include an access network interface unit to send and receive communications and a processor with a memory associated with the network interface unit.

3. The system of claim 1, wherein the at least one of the first network applications is responsible for a plurality of functional capabilities of the programmable network device and is capable of at least one of the group consisting of: updating the firmware of the programmable network device; updating default communication protocols of the programmable network device; initializing programmable network device settings; boot loading the programmable network device; providing security digital certificates; providing operating system (OS) and kernel upgrades; and upgrading and commissioning agents for upgrades of the at least one of the first network applications.

4. The system of claim 1, wherein at least one of the second network applications is responsible for a plurality of functional capabilities of the programmable cloud device and is capable of at least one of the group consisting of: upgrading and commissioning agents for upgrades of the at least one of the second network applications and related procedures; hypervisor upgrades; virtual machine and isolated execution environment lifecycle management; security digital certificate management; operating system (OS) and kernel upgrades; and default communication protocols.

5. The system of claim 1, wherein the programmable network device is a Long Term Evolution (LTE) evolved NodeB (eNB) and the programmable cloud device hosts LTE core network functions in separate virtual machines, the network functions consisting of: Mobility Management Entity (MME), Serving Gateway (S-GW), and Packet Gateway (P-GW).

6. The system of claim 1, wherein the programmable network device and programmable cloud device further comprise:
a virtual fabric which provides a secure communication layer for the at least one of the plurality of first network applications and the at least one of the plurality of second network applications.

7. The system of claim 1, further comprising:
a second programmable network device which includes the at least one of the plurality of first network applications which is in the first programmable network device.

8. The system of claim 1, wherein the programmable network device and programmable cloud device further comprise:
a distributed resource service (DRS) which controls access to a plurality of resources by the plurality of first network applications and the plurality of the second network applications upon receiving instructions from the application management portal.

9. The system of claim 8, wherein the plurality of resources include at least one of a group consisting of: a firewall; data and statistics; storage; compute; load evaluator; general settings; routing engine; virtual machine master controller; power controller; and wireless engine.

10. The system of claim 8, wherein the DRS further includes a load controller; and wherein the load controller is adapted to monitor loads on at least one of the plurality of first network applications and at least one of the plurality of second network applications and effect change in accordance with thresholds received from the application management portal.

11. The system of claim 8, wherein the programmable network device and programmable cloud device further comprise:
a distributed resource service which is capable of providing at least one service from a group consisting of: exposing application programming interfaces (APIs) to other applications; configuring and managing platform resources; policy enforcement and authorization of applications access to platform resource and other application's APIs; and policy conflict resolution.

12. The system of claim 1, wherein the programmable network device and programmable cloud device further comprise:
a distributed content service wherein contents generated by the at least one of the plurality of first network applications may be shared with the at least one of a plurality of second network applications.

13. The system of claim 1, wherein the programmable network device and programmable cloud device further comprise:
a distributed notification service wherein notice of a particular event is sent from at least one of the plurality of first network applications to at least one of the plurality of second network applications.

14. The system of claim 1, wherein the programmable network device, at least one of the plurality of first network applications, the programmable cloud device, and at least one of the plurality of second network applications each have unique identities.

15. The system of claim 1 wherein the at least one of the plurality of first network applications and the at least one of the plurality of second network applications communicate using communication protocols implemented in both the at least one of the plurality of first network applications and the at least one of the plurality of second network applications.

16. The system of claim 1, wherein the programmable cloud device is a packet data network gateway.

17. The system of claim 1, wherein the programmable network device is capable of securely processing a plurality of distinct functions in coordination with other programmable network devices and other programmable cloud devices.

18. A system for processing data packets in a mobile data wireless network, the system comprising:
a programmable network device processing data flows, hosting at least one of a plurality of first network applications and located at a wireless edge of the mobile data wireless network;
a programmable cloud device having a plurality of virtual machines wherein at least one of the virtual machines hosts at least one of a plurality of second network applications and wherein the programmable cloud device is located in a core of the mobile data wireless network;
wherein the at least one of the plurality of first network applications and the at least one of the plurality of second network applications are in secure communication to form a distributed application;
the programmable network device is powered by a sandboxing operating system which facilitates deployment of the plurality of first network applications independent of hardware vendor associated with the programmable network device, and facilitates hot upgrade of the plurality of first network applications with substantially no interruption to operation of the programmable network device;

wherein the programmable network device verifies authenticity and integrity of upgrades to the plurality of first network applications and the programmable cloud device verifies the authenticity and integrity of upgrades to the plurality of second network applications and wherein the verification is based on unique security keys associated with each of the plurality of first and second network applications;

wherein the programmable network device and the programmable cloud device form unified capabilities using a plurality of application programming interfaces (APIs) wherein the APIs accessible to each of the plurality of the first network applications and the plurality of second network applications are determined based on a respective access level associated with each of the plurality of first and second network applications;

an application repository storing distributed applications which have been tested and certified for installation in the programmable network device and programmable cloud device; and an application management portal coupled to the programmable network device, the programmable cloud device and the application repository, wherein the application management portal presents a user interface to manage provisioning, usage and de-provisioning of the distributed applications on the programmable network device and programmable cloud device.

19. A system for processing data packets in a mobile data wireless network, the system comprising:

a programmable network device processing data flows, hosting at least one of a plurality of first network applications and located at a wireless edge of the mobile data wireless network;

a programmable cloud device partitioned into a plurality of zones, wherein at least one of the plurality of zones hosts at least one of a plurality of second network applications and wherein the programmable cloud device is located in a core of the mobile data wireless network;

wherein the at least one of the plurality of first network applications and the at least one of the plurality of second network applications are in secure communication to form a distributed application;

the programmable network device is powered by a sandboxing operating system which facilitates deployment of the plurality of first network applications independent of hardware vendor associated with the programmable network device, and facilitates hot upgrade of the plurality of first network applications with substantially no interruption to operation of the programmable network device;

wherein the programmable network device verifies authenticity and integrity of upgrades to the plurality of first network applications and the programmable cloud device verifies the authenticity and integrity of upgrades to the plurality of second network applications and wherein the verification is based on unique security keys associated with each of the plurality of first and second network applications;

wherein the programmable network device and the programmable cloud device form unified capabilities using a plurality of application programming interfaces (APIs) wherein the APIs accessible to each of the plurality of the first network applications and the plurality of second network applications are determined based on a respective access level associated with each of the plurality of first and second network applications;

an application repository storing distributed applications which have been tested and certified for installation in the programmable network device and programmable cloud device; and an application management portal coupled to the programmable network device, the programmable cloud device and the application repository, wherein the application management portal presents a user interface to manage provisioning, usage and de-provisioning of the distributed applications on the programmable network device and the programmable cloud device.

20. A method of processing data packets in a mobile data wireless network, the method comprising:

establishing secure communications between distributed applications comprising at least one of a plurality of first network applications hosted by a programmable network device located at a wireless edge of the mobile data wireless network and at least one of a plurality of second network applications hosted by a programmable cloud device located in a core of the mobile data wireless network;

powering the programmable network device by a sandboxing operating system;

facilitating by the sandboxing operating systems, deployment of the plurality of first network applications independent of hardware vendor associated with the programmable network device;

facilitating by the sandboxing operating system, hot upgrade of the plurality of first network applications with substantially no interruption to operation of the programmable network device;

verifying the authenticity and integrity of upgrades to the plurality of first network applications by the programmable network device and verifying the authenticity and integrity of the plurality of second network applications by the programmable cloud device, wherein the verifications are based on unique security keys associated with each one of the plurality of first and second network applications;

forming unified capabilities by the programmable network device and programmable cloud device using a plurality of application programming interfaces (APIs) wherein the APIs accessible to each of the plurality of first network applications and the plurality of second network applications are determined based on a respective access level associated with each of the plurality of first and second network applications;

storing the distributed applications in an application repository, wherein the distributed applications have been tested and certified for installation in the programmable network device and the programmable cloud device; and presenting a user-interface of an application management portal to manage provisioning, usage and de-provisioning of the distributed applications on the programmable network device and programmable cloud device, wherein the application management portal is coupled to the programmable network device, the programmable cloud device and the application repository.

21. A system for processing data packets in a mobile data wireless network, the system comprising:

a plurality of programmable network devices hosting a plurality of first network applications and located at a wireless edge of the mobile data wireless network;

a plurality of programmable cloud devices hosting a plurality of second network applications and located in a core of the mobile data wireless network;

wherein at least one of the plurality of first network applications in at least one of the plurality of programmable network devices and at least one of the plurality of second network applications in at least one of the plurality of programmable cloud devices are in secure communication with each other to form a distributed applications;

wherein the plurality of programmable network devices are each powered by a sandboxing operating system which facilitates deployment of the plurality of first network applications independent of hardware vendors associated with the plurality of programmable network devices, and facilitates hot upgrade of the plurality of first network applications with substantially no interruption to operation of the plurality of programmable network devices;

wherein the plurality of programmable network devices verify authenticity and integrity of upgrades to the plurality of first network applications and the plurality of programmable cloud devices verify authenticity and integrity of upgrades to the plurality of second network applications and wherein the verification is based on unique security keys associated with each of the plurality of first and second network applications;

wherein the plurality of programmable network devices and the plurality of programmable cloud devices form unified capabilities using a plurality of application programming interfaces (APIs) wherein the APIs accessible to each of the plurality of the first network applications and the plurality of second network applications are determined based on a respective access level associated with each of the plurality of first and second network applications;

an application repository storing distributed applications which have been tested and certified for installation in the plurality of programmable network devices and the plurality of programmable cloud devices; and an application management portal coupled to the plurality of programmable network devices, the plurality of programmable cloud devices and the application repository, wherein the application management portal presents a user interface to manage provisioning, usage and de-provisioning of the distributed applications on the plurality of programmable network devices and the plurality of programmable cloud devices.

* * * * *